United States Patent
Kikin-Gil et al.

(10) Patent No.: US 9,996,241 B2
(45) Date of Patent: Jun. 12, 2018

(54) INTERACTIVE VISUALIZATION OF MULTIPLE SOFTWARE FUNCTIONALITY CONTENT ITEMS

(75) Inventors: Erez Kikin-Gil, Redmond, WA (US); Ned B. Friend, Seattle, WA (US); Matthew J. Kotler, Sammamish, WA (US); Charles W. Parker, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 778 days.

(21) Appl. No.: 13/271,148

(22) Filed: Oct. 11, 2011

(65) Prior Publication Data
US 2013/0091465 A1    Apr. 11, 2013

(51) Int. Cl.
*G06F 3/048* (2013.01)
*G06F 3/0485* (2013.01)
*G06F 3/0484* (2013.01)
*G06F 9/44* (2018.01)

(52) U.S. Cl.
CPC ........ *G06F 3/0485* (2013.01); *G06F 3/04847* (2013.01); *G06F 3/04855* (2013.01); *G06F 9/4443* (2013.01)

(58) Field of Classification Search
CPC combination set(s) only.
See application file for complete search history.

(56) References Cited

U.S. PATENT DOCUMENTS

| | | | |
|---|---|---|---|
| 4,831,552 A | 5/1989 | Scully et al. | |
| 5,297,250 A | 3/1994 | Leroy et al. | |
| 5,495,269 A | 2/1996 | Elrod et al. | |
| 5,566,291 A | 10/1996 | Boulton et al. | |

(Continued)

FOREIGN PATENT DOCUMENTS

| | | |
|---|---|---|
| CN | 1551567 A | 12/2004 |
| CN | 1723431 A | 1/2006 |

(Continued)

OTHER PUBLICATIONS

"Activity Explorer: Activity-centric Collaboration from Research to Product," IBM Systems Journal, IBM®, 23 pages accessed on Feb. 3, 2009, accessed at: http://www.research.ibm.com/journal/sj/454/geyer.html.

(Continued)

*Primary Examiner* — Hien L Duong
(74) *Attorney, Agent, or Firm* — Merchant & Gould P.C.

(57) ABSTRACT

Interactive visualization of multiple software functionality content items is provided. A variety of content items may be associated with each other according to one or more association attributes. A visualization presentation of one or more of the content items may be displayed in a visualization interface. Organization of content items may be made in association with a visualization ordering based on one or more logical attributes. An ordered navigation interface component may be provided to allow navigation of the displayed content items in a moving visualization such that a focused on content item may be displayed in a main or primary display position. Users may interact with each (Continued)

content item displayed in the visualization interface to include providing edits, comments, feedback, and the like.

27 Claims, 12 Drawing Sheets

(56) References Cited

U.S. PATENT DOCUMENTS

| | | |
|---|---|---|
| 5,675,752 A | 10/1997 | Scott et al. |
| 5,704,029 A | 12/1997 | Wright, Jr. |
| 5,717,869 A | 2/1998 | Moran et al. |
| 5,802,299 A | 9/1998 | Logan et al. |
| 5,821,925 A | 10/1998 | Carey et al. |
| 5,821,932 A | 10/1998 | Pittore |
| 5,893,098 A | 4/1999 | Peters et al. |
| 5,907,324 A | 5/1999 | Larson et al. |
| 6,016,478 A | 1/2000 | Zhang et al. |
| 6,018,346 A | 1/2000 | Moran |
| 6,119,147 A | 9/2000 | Toomey |
| 6,192,395 B1 | 2/2001 | Lerner et al. |
| 6,208,339 B1 | 3/2001 | Atlas et al. |
| 6,230,185 B1 | 5/2001 | Salas et al. |
| 6,353,436 B1 | 3/2002 | Reichlen |
| 6,553,417 B1 | 4/2003 | Gampper |
| 6,546,246 B1 | 5/2003 | Varma |
| 6,633,315 B1 | 10/2003 | Sobeski et al. |
| 6,670,970 B1 | 12/2003 | Bonura et al. |
| 6,735,615 B1 | 5/2004 | Iwayama et al. |
| 6,738,075 B1 | 5/2004 | Torres et al. |
| 7,035,865 B2 | 4/2006 | Doss et al. |
| 7,036,076 B2 | 4/2006 | Anwar |
| 7,051,285 B1 | 5/2006 | Harrison et al. |
| 7,073,127 B2 | 7/2006 | Zhao et al. |
| 7,075,513 B2 | 7/2006 | Silfverberg et al. |
| 7,124,164 B1 | 10/2006 | Chemtob |
| 7,171,567 B1 | 1/2007 | Bayer et al. |
| 7,203,479 B2 | 4/2007 | Deeds |
| 7,225,257 B2 | 5/2007 | Aoike et al. |
| 7,233,933 B2 | 6/2007 | Horvitz et al. |
| 7,242,389 B1 | 7/2007 | Stern |
| 7,246,316 B2 | 7/2007 | Furlong et al. |
| 7,248,677 B2 | 7/2007 | Randall et al. |
| 7,251,786 B2 | 7/2007 | Wynn et al. |
| 7,269,787 B2 | 9/2007 | Amitay et al. |
| 7,299,193 B2 | 11/2007 | Cragun et al. |
| 7,299,405 B1 | 11/2007 | Lee et al. |
| 7,299,418 B2 | 11/2007 | Dieberger |
| 7,401,300 B2 | 7/2008 | Murmi |
| 7,426,297 B2 | 9/2008 | Zhang et al. |
| 7,447,713 B1 | 11/2008 | Berkheimer |
| 7,451,186 B2 | 11/2008 | Morinigo et al. |
| 7,454,439 B1 | 11/2008 | Gansner |
| 7,466,334 B1 | 12/2008 | Baba |
| 7,469,222 B1 | 12/2008 | Glazer |
| 7,478,129 B1 | 1/2009 | Chemtob |
| 7,512,906 B1 | 3/2009 | Baier et al. |
| 7,554,576 B2 | 6/2009 | Erol et al. |
| 7,571,210 B2 | 8/2009 | Swanson et al. |
| 7,590,941 B2 | 9/2009 | Wee |
| 7,599,989 B2 | 10/2009 | Stevens et al. |
| 7,606,862 B2 | 10/2009 | Swearingen et al. |
| 7,627,830 B1 | 12/2009 | Espinoza et al. |
| 7,636,754 B2 | 12/2009 | Zhu et al. |
| 7,669,141 B1 | 2/2010 | Pegg |
| 7,679,518 B1 | 3/2010 | Pabla et al. |
| 7,730,411 B2 | 6/2010 | Chotai et al. |
| 7,743,098 B2 | 6/2010 | Anglin et al. |
| 7,764,247 B2 | 7/2010 | Blanco et al. |
| 7,770,116 B2 | 8/2010 | Zhang et al. |
| 7,774,221 B2 | 8/2010 | Miller et al. |
| 7,818,678 B2 | 10/2010 | Massand |
| 7,869,941 B2 | 1/2011 | Coughlin et al. |
| 7,911,409 B1 | 3/2011 | Chatterjee et al. |
| 7,941,399 B2 | 5/2011 | Bailor et al. |
| 7,962,525 B2 | 6/2011 | Kansal |
| 7,984,387 B2 | 7/2011 | Batthish et al. |
| 7,992,089 B2 | 8/2011 | Murray et al. |
| 8,032,832 B2 | 10/2011 | Russ et al. |
| 8,099,458 B2 | 1/2012 | Burtner, IV et al. |
| 8,126,974 B2 | 2/2012 | Lyle et al. |
| 8,150,719 B2 | 4/2012 | Perella et al. |
| 8,161,419 B2 | 4/2012 | Palahnuk et al. |
| 8,204,942 B2 | 6/2012 | Roskind et al. |
| 8,214,748 B2 | 7/2012 | Srikanth et al. |
| 8,330,795 B2 | 12/2012 | Iyer et al. |
| 8,358,762 B1 | 1/2013 | Renner et al. |
| 8,385,964 B2 | 2/2013 | Haney |
| 8,423,883 B1 * | 4/2013 | Stockmann ............ G09G 3/003 345/549 |
| 8,437,461 B1 | 5/2013 | Gartner et al. |
| 8,452,839 B2 | 5/2013 | Heikes et al. |
| 8,517,888 B1 | 8/2013 | Brookins |
| 8,560,487 B2 | 10/2013 | Jhoney et al. |
| 8,583,148 B2 | 11/2013 | Ollila et al. |
| 8,606,517 B1 | 12/2013 | Ehrlacher et al. |
| 8,631,119 B2 | 1/2014 | Malkin et al. |
| 8,682,973 B2 | 3/2014 | Kikin-Gil et al. |
| 8,768,308 B2 | 7/2014 | Kim et al. |
| 8,826,117 B1 * | 9/2014 | Junee .................. G11B 27/034 715/230 |
| 2001/0040592 A1 | 11/2001 | Foreman et al. |
| 2002/0044683 A1 | 4/2002 | Deshpande et al. |
| 2002/0059604 A1 | 5/2002 | Papagan et al. |
| 2002/0062403 A1 | 5/2002 | Burnett et al. |
| 2002/0143876 A1 | 10/2002 | Boyer et al. |
| 2002/0143877 A1 | 10/2002 | Hackbarth et al. |
| 2003/0020805 A1 | 1/2003 | Allen et al. |
| 2003/0038831 A1 * | 2/2003 | Engelfriet ..................... 345/719 |
| 2003/0061284 A1 | 3/2003 | Mandarino et al. |
| 2003/0122863 A1 | 7/2003 | Dieberger et al. |
| 2003/0137539 A1 | 7/2003 | Dees |
| 2003/0142133 A1 | 7/2003 | Brown et al. |
| 2003/0158900 A1 | 8/2003 | Santos |
| 2003/0172174 A1 | 9/2003 | Mihalcheon |
| 2003/0222890 A1 | 12/2003 | Salesin et al. |
| 2004/0024822 A1 | 2/2004 | Werndorfer et al. |
| 2004/0027370 A1 | 2/2004 | Jaeger |
| 2004/0030992 A1 | 2/2004 | Molsa et al. |
| 2004/0034622 A1 | 2/2004 | Espinoza et al. |
| 2004/0062383 A1 | 4/2004 | Sylvain |
| 2004/0085354 A1 | 5/2004 | Massand |
| 2004/0128350 A1 | 7/2004 | Topfl et al. |
| 2004/0150627 A1 | 8/2004 | Luman et al. |
| 2004/0161090 A1 | 8/2004 | Digate et al. |
| 2004/0169683 A1 | 9/2004 | Chiu et al. |
| 2004/0175036 A1 | 9/2004 | Graham |
| 2004/0196286 A1 | 10/2004 | Guzik |
| 2004/0254998 A1 | 12/2004 | Horvitz |
| 2004/0263636 A1 | 12/2004 | Cutler et al. |
| 2004/0267701 A1 | 12/2004 | Horvitz et al. |
| 2005/0005025 A1 | 1/2005 | Harville et al. |
| 2005/0018828 A1 | 1/2005 | Nierhaus et al. |
| 2005/0055625 A1 | 3/2005 | Kloss ..................... 715/500.1 |
| 2005/0081160 A1 | 4/2005 | Wee et al. |
| 2005/0088410 A1 | 4/2005 | Chaudhri |
| 2005/0091571 A1 | 4/2005 | Leichtling |
| 2005/0091596 A1 * | 4/2005 | Anthony et al. .............. 715/712 |
| 2005/0125246 A1 | 6/2005 | Muller et al. |
| 2005/0125717 A1 | 6/2005 | Segal et al. |
| 2005/0138109 A1 | 6/2005 | Redlich et al. |
| 2005/0138570 A1 | 6/2005 | Good et al. |
| 2005/0171830 A1 | 8/2005 | Miller et al. |
| 2005/0246642 A1 | 11/2005 | Valderas et al. |
| 2006/0004911 A1 | 1/2006 | Becker |
| 2006/0010023 A1 | 1/2006 | Tromczynski et al. |
| 2006/0010197 A1 | 1/2006 | Overden |
| 2006/0026253 A1 | 2/2006 | Kessen et al. |
| 2006/0053380 A1 | 3/2006 | Spataro et al. |
| 2006/0067250 A1 | 3/2006 | Boyer et al. |
| 2006/0080610 A1 | 4/2006 | Kaminsky |
| 2006/0082594 A1 | 4/2006 | Vafiadis et al. ............... 345/629 |
| 2006/0132507 A1 | 6/2006 | Wang |
| 2006/0136828 A1 | 6/2006 | Asano |
| 2006/0143063 A1 | 6/2006 | Braun et al. |

(56) References Cited

U.S. PATENT DOCUMENTS

| | | |
|---|---|---|
| 2006/0146765 A1 | 7/2006 | De Sluis et al. |
| 2006/0161585 A1 | 7/2006 | Clarke et al. |
| 2006/0167996 A1 | 7/2006 | Orsolini et al. |
| 2006/0168533 A1 | 7/2006 | Yip et al. |
| 2006/0171515 A1 | 8/2006 | Hintermeister et al. |
| 2006/0184872 A1 | 8/2006 | Dontcheva et al. |
| 2006/0190547 A1 | 8/2006 | Bhogal et al. |
| 2006/0195587 A1 | 8/2006 | Cadiz et al. |
| 2006/0234735 A1 | 10/2006 | Digate et al. |
| 2006/0239212 A1 | 10/2006 | Pirzada et al. |
| 2006/0259875 A1 | 11/2006 | Collins et al. |
| 2006/0265398 A1 | 11/2006 | Kaufman |
| 2006/0282759 A1 | 12/2006 | Collins et al. |
| 2007/0005752 A1 | 1/2007 | Chawla et al. |
| 2007/0011231 A1 | 1/2007 | Manion et al. |
| 2007/0074268 A1 | 3/2007 | Pepper et al. |
| 2007/0083597 A1 | 4/2007 | Salesky et al. |
| 2007/0100937 A1 | 5/2007 | Burtner et al. |
| 2007/0106724 A1 | 5/2007 | Gorti et al. |
| 2007/0112926 A1 | 5/2007 | Brett et al. |
| 2007/0150583 A1 | 6/2007 | Asthana et al. |
| 2007/0168447 A1 | 7/2007 | Chen et al. |
| 2007/0174389 A1 | 7/2007 | Armstrong |
| 2007/0185870 A1 | 8/2007 | Hogue et al. ................. 707/7 |
| 2007/0189487 A1 | 8/2007 | Sharland et al. |
| 2007/0214423 A1 | 9/2007 | Teplov et al. |
| 2007/0219645 A1 | 9/2007 | Thomas et al. |
| 2007/0226032 A1 | 9/2007 | White |
| 2007/0245238 A1 | 10/2007 | Fugitt et al. ................. 715/700 |
| 2007/0253424 A1 | 11/2007 | Herot et al. |
| 2007/0276909 A1 | 11/2007 | Chavda et al. |
| 2007/0279416 A1 | 12/2007 | Cobb et al. |
| 2007/0294612 A1 | 12/2007 | Drucker et al. |
| 2007/0300185 A1 | 12/2007 | Macbeth et al. |
| 2008/0005235 A1 | 1/2008 | Hedge |
| 2008/0008458 A1 | 1/2008 | Gudipaty et al. |
| 2008/0013698 A1 | 1/2008 | Holtzberg |
| 2008/0022225 A1 | 1/2008 | Erl |
| 2008/0040187 A1 | 2/2008 | Carraher et al. |
| 2008/0040188 A1 | 2/2008 | Klausmeier |
| 2008/0059889 A1 | 3/2008 | Parker et al. ................. 715/748 |
| 2008/0065580 A1 | 3/2008 | Spence et al. |
| 2008/0066016 A1* | 3/2008 | Dowdy et al. ................. 715/854 |
| 2008/0084984 A1 | 4/2008 | Levy et al. |
| 2008/0086688 A1* | 4/2008 | Chandratillake . G06F 17/30817 715/719 |
| 2008/0098328 A1 | 4/2008 | Rollin et al. |
| 2008/0114844 A1 | 5/2008 | Sanchez et al. |
| 2008/0115076 A1 | 5/2008 | Frank et al. |
| 2008/0136897 A1 | 6/2008 | Morishima et al. |
| 2008/0141126 A1 | 6/2008 | Johnson |
| 2008/0177782 A1 | 7/2008 | Poston et al. |
| 2008/0189624 A1 | 8/2008 | Chotai et al. |
| 2008/0195981 A1 | 8/2008 | Puller et al. |
| 2008/0239995 A1 | 10/2008 | Lee et al. |
| 2008/0244442 A1 | 10/2008 | Vaselova et al. |
| 2008/0263460 A1 | 10/2008 | Altberg |
| 2008/0276174 A1 | 11/2008 | Hintermeister et al. |
| 2008/0288889 A1 | 11/2008 | Hunt et al. ................. 715/810 |
| 2008/0300944 A1 | 12/2008 | Surazski et al. |
| 2008/0303746 A1 | 12/2008 | Schlottmann et al. |
| 2008/0307322 A1 | 12/2008 | Stochosky |
| 2008/0320082 A1 | 12/2008 | Kuhlke et al. |
| 2009/0006980 A1 | 1/2009 | Hawley |
| 2009/0006982 A1 | 1/2009 | Curtis et al. |
| 2009/0007014 A1* | 1/2009 | Coomer et al. ................. 715/830 |
| 2009/0019367 A1 | 1/2009 | Cavagnari et al. |
| 2009/0030766 A1 | 1/2009 | Denner et al. |
| 2009/0037848 A1* | 2/2009 | Tewari et al. ................. 715/835 |
| 2009/0043856 A1 | 2/2009 | Darby |
| 2009/0055739 A1 | 2/2009 | Murillo et al. |
| 2009/0089055 A1 | 4/2009 | Caspi |
| 2009/0094367 A1 | 4/2009 | Song et al. |
| 2009/0109180 A1 | 4/2009 | Do |
| 2009/0112703 A1 | 4/2009 | Brown |
| 2009/0119255 A1 | 5/2009 | Frank et al. |
| 2009/0119604 A1 | 5/2009 | Simard |
| 2009/0129596 A1 | 5/2009 | Chavez et al. |
| 2009/0138552 A1 | 5/2009 | Johnson et al. |
| 2009/0138826 A1 | 5/2009 | Barros ................. 715/841 |
| 2009/0183095 A1 | 7/2009 | Deitsch |
| 2009/0204671 A1 | 8/2009 | Hawkins et al. |
| 2009/0210793 A1* | 8/2009 | Yee et al. ................. 715/723 |
| 2009/0222741 A1 | 9/2009 | Shaw et al. |
| 2009/0228569 A1 | 9/2009 | Kalmanje et al. |
| 2009/0234721 A1 | 9/2009 | Bigelow et al. |
| 2009/0235177 A1 | 9/2009 | Saul et al. |
| 2009/0249223 A1* | 10/2009 | Barsook et al. ................. 715/753 |
| 2009/0254843 A1 | 10/2009 | Van Wie et al. |
| 2009/0265632 A1 | 10/2009 | Russ et al. |
| 2009/0282339 A1 | 11/2009 | Van Melle et al. |
| 2009/0309846 A1 | 12/2009 | Trachtenberg |
| 2009/0313584 A1 | 12/2009 | Kerr et al. |
| 2009/0319562 A1 | 12/2009 | Morten et al. ................. 707/103 R |
| 2010/0031152 A1 | 2/2010 | Villaron et al. |
| 2010/0037140 A1 | 2/2010 | Penner et al. |
| 2010/0037151 A1 | 2/2010 | Ackerman |
| 2010/0058201 A1 | 3/2010 | Harvey et al. |
| 2010/0097331 A1 | 4/2010 | Wu |
| 2010/0114691 A1* | 5/2010 | Wu et al. ................. 705/14.44 |
| 2010/0114991 A1* | 5/2010 | Chaudhary et al. ................. 707/809 |
| 2010/0131868 A1 | 5/2010 | Chawla et al. |
| 2010/0138756 A1 | 6/2010 | Saund et al. |
| 2010/0149307 A1 | 6/2010 | Iyer et al. |
| 2010/0174993 A1* | 7/2010 | Pennington et al. ................. 715/738 |
| 2010/0201707 A1 | 8/2010 | Rasmussen et al. |
| 2010/0235216 A1 | 9/2010 | Hehmeyer et al. |
| 2010/0235763 A1 | 9/2010 | Massand |
| 2010/0241968 A1 | 9/2010 | Tarara et al. |
| 2010/0251140 A1 | 9/2010 | Tipirneni |
| 2010/0268705 A1 | 10/2010 | Douglas et al. |
| 2010/0279266 A1 | 11/2010 | Laine et al. |
| 2010/0306004 A1 | 12/2010 | Burtner et al. |
| 2010/0306018 A1 | 12/2010 | Burtner et al. |
| 2010/0312706 A1 | 12/2010 | Combet et al. |
| 2010/0324963 A1 | 12/2010 | Gupta et al. |
| 2011/0022967 A1 | 1/2011 | Vijayakumar et al. |
| 2011/0105092 A1 | 5/2011 | Felt et al. |
| 2011/0107241 A1 | 5/2011 | Moore |
| 2011/0113348 A1* | 5/2011 | Twiss et al. ................. 715/753 |
| 2011/0113351 A1 | 5/2011 | Phillips |
| 2011/0137894 A1 | 6/2011 | Narayanan et al. |
| 2011/0154180 A1 | 6/2011 | Evanitsky et al. |
| 2011/0161130 A1 | 6/2011 | Whalin et al. |
| 2011/0185288 A1 | 7/2011 | Gupta et al. |
| 2011/0212430 A1 | 9/2011 | Smithmier et al. |
| 2011/0239142 A1 | 9/2011 | Steeves et al. |
| 2011/0282871 A1 | 11/2011 | Seefeld et al. |
| 2011/0289142 A1 | 11/2011 | Whalin et al. |
| 2011/0289433 A1 | 11/2011 | Whalin et al. |
| 2011/0295879 A1 | 12/2011 | Logis et al. |
| 2012/0023418 A1* | 1/2012 | Frields et al. ................. 715/756 |
| 2012/0050197 A1 | 3/2012 | Kemmochi |
| 2012/0075337 A1 | 3/2012 | Rasmussen et al. |
| 2012/0078708 A1 | 3/2012 | Taylor et al. |
| 2012/0144325 A1 | 6/2012 | Mital et al. |
| 2012/0150577 A1 | 6/2012 | Berg |
| 2012/0150863 A1 | 6/2012 | Fish |
| 2012/0159347 A1 | 6/2012 | Fish |
| 2012/0159355 A1 | 6/2012 | Fish |
| 2012/0166985 A1 | 6/2012 | Friend |
| 2012/0179980 A1 | 7/2012 | Whalin et al. |
| 2012/0179981 A1 | 7/2012 | Whalin et al. |
| 2012/0233543 A1 | 9/2012 | Vagell et al. |
| 2013/0007103 A1 | 1/2013 | Braun et al. |
| 2013/0035853 A1 | 2/2013 | Stout et al. |
| 2013/0091205 A1 | 4/2013 | Kotler et al. |
| 2013/0091440 A1 | 4/2013 | Kotler et al. |
| 2013/0097544 A1 | 4/2013 | Parker et al. |
| 2013/0101978 A1 | 4/2013 | Ahl et al. |
| 2013/0124978 A1 | 5/2013 | Horns et al. |
| 2013/0132886 A1 | 5/2013 | Mangini et al. |
| 2013/0154946 A1 | 6/2013 | Sakuramata et al. |
| 2013/0211980 A1 | 8/2013 | Heiferman et al. |

(56) References Cited

U.S. PATENT DOCUMENTS

| | | | |
|---|---|---|---|
| 2013/0212494 | A1 | 8/2013 | Heiferman et al. |
| 2013/0239002 | A1 | 9/2013 | Maloney et al. |
| 2013/0246903 | A1 | 9/2013 | Mukai |
| 2013/0263020 | A1 | 10/2013 | Heiferman et al. |
| 2014/0033068 | A1* | 1/2014 | Gupta et al. ............... 715/751 |
| 2014/0207867 | A1 | 7/2014 | Kotler et al. |
| 2014/0317561 | A1 | 10/2014 | Robinson et al. |
| 2015/0127628 | A1 | 5/2015 | Rathod |

FOREIGN PATENT DOCUMENTS

| | | |
|---|---|---|
| CN | 1928859 A | 3/2007 |
| CN | 1992625 A | 7/2007 |
| CN | 101689188 A | 3/2010 |
| CN | 101834905 A | 9/2010 |
| EP | 1 517 260 | 3/2005 |
| JP | 04-257046 | 9/1992 |
| RU | 2005139793 A | 6/2007 |
| WO | WO 02/061682 | 8/2002 |
| WO | 2006/100475 A1 | 9/2006 |
| WO | 2007092470 A2 | 8/2007 |

OTHER PUBLICATIONS

Adams et al., "Distributed Research Teams: Meeting Asynchronously in Virtual Space", Institute of Electrical and Electronics Engineers (1999), 17 pages.

"Adobe Connect", Retrieved from: <http://www.adobe.com/acom/connectnow/> on Oct. 11, 2010, (Sep. 16, 2010), 3 pages.

"Adobe ConnectNow", Retrieved from: <http://www.adobe.com/acom/connectnow/> on Oct. 13, 2010, (2010), 6 pages.

"An Overview of Aabel 3 Features"—Retrieved Date: Jul. 21, 2010, http://www.gigawiz.com/Aabel.html, 19 pgs.

"Aquatic Sugar: The Children's Interface, Translated for Adults," One Laptop Per Child News, Nov. 7, 2007, 5 pages.

The Beginner's Guide to Data Visualization, Tableau Software, http://www.tableausoftware.com/beginners-data-visualization, pp. 1-6 (Date Retrieved Jul. 21, 2010).

Bell, David et al., "Sensory Semantic User Interfaces (SenSUI) (position paper)", Fluidity Research Grouo: Brunei University. (Oct. 20, 2009), 14 pages.

Bunzel, Tom "Using Quindi Meeting Capture", retrieved from http://www.informit.com/guides/content.as[2x?g=msoffice &segNum=220, (Sep. 1, 2006), 3 pages.

Cathy, et al., "Mindshift Innovation", Oct. 4, 2007, 2 pages.

"Cisco Context-Aware Mobility Solution: Presence Applications", retrieved from https://www.cisco.com/en/US/solutions/collateral/ns340/ns394/ns348/ns788/brochure c22-497557.html on Sep. 7, 2010, 5 pages.

"Collaboration within the Telepresence Experience"—Published Date: Jan. 2010, http://www.wrplatinum.com/Downloads/11056.aspx, 11 pgs.

"CounterPoint: A Zooming Presentation Tool"; http://web.archive.org/web/20050205082738/www.cs.umd.edu/hcil/counterpoint/, Archive.org 2005 Capture, 3 pgs.

"Create treemaps using easy drag and drop interactions"—Retrieved Date: Jul. 21, 2010, http://www.magnaview.nl/treemap/, 1 pg.).

"CSS Max-width Property" by W3Schools, archived by Internet Archive WaybackMachine Jun. 8, 2007, downloaded Nov. 16, 2012; 1 pg.

"Datapoint". Version 1.1, 1997-2007, FileDudes.com, 2 pages.

Derthick et al., "An Interactive Visualization Environment for Data Exploration", Published Date: Aug. 1997, http://www.cs.cmu.edu/~sage/KDD97.html, 9 pages.

"Description for SharePoint Meeting Manager", Retrieved from: <http://www.softpicks.net/software/Business/Project-Managemen/SharePoint-Meeting-Manager-47146.htm> on Oct. 11, 2010 (Jul. 27, 2009),2 pages.

Fernando et al., "Narrowcasting Attributes for Presence Awareness in Collaborative Virtual Environments", Published Date: 2006, http://ieeexploreleee.org/stamp/stamp.jsp?tp=&arnumber=4019930, 6 pgs.

"Free PhotoMesa 3.1.2 (Windows)", retrieved on Dec. 28, 2007 at <<http://www.windsorinterfaces.com/photomesa.shtml>>, Windsor Interfaces Inc., 3 pages.

Fruchter, Renate "Brick & Bits & Interaction (BBI)", http://www.ii.ist.i.kyotou.ac.io/sid/sid2001/oaoers/oositions/bricksbitsinteraction.odf (2001), 4 pages.

Gallegos, D., et al. "CounterPoint User Manual" class project for Charles Paine at the University of New Mexico, Downloaded from Archive. Org 2005 capture, http://web.archive.org/web/20050205082738/www.cs.umd.edu/hcil/counterpoint/, 21 pgs.

Good et al. (2001) "CounterPoint: Creating Jazzy Interactive Presentations"; HCIL Tech Report #2001-03, University of Maryland, College Park, MD 20742, 9 pgs.

"GoToMeeting", Retrieved from: <httQ://www.gotomeeting.com/fec/online meeting> on Oct. 11, 2010, 1 page.

Greenberg et al.; "Human and Technical Factors of distributed Group Drawing Tools," Interacting with Computers 4 (1), Dec. 1992, Butterworth-Heinemann (Special edition on CSCW, Tom Rodden ed.) pp. 364-392.

Hupfer et al., "Introducing Collaboration into an Application Development Environment," CSCW '04, Nov. 6-10, 2004, 4 pages.

Ionescu, Arna et al., "Workspace Navigator: Tools for Capture, Recall and Reuse using Spatial Cues in an Interactive Workspace", Stanford Technical Re[2ort TR2002-04 htto://bci.stanford.edu/research/wksocNavTR.odf (2002), 16 pages.

Izadi et al., "Dynamo: A public interactive surface supporting the cooperative sharing and exchange of media" Published Date: Apr. 2007, http://hci.stanford.edu/publications/2007/range-wip-final.pdf, 10 pgs.

Ju, Wendy et al., "Where the Wild Things Work: Capturing Shared Physical Design Workspaces"; Stanford University, CSCW '04, Nov 601-, 9 pgs.

Kim, Hyun H., et al., "SmartMeeting: CMPT 481/811 Automatic Meeting Recording System", http://www.cs.usask.ca/grads/hyk564/homePage/811/CM PT%20811 %20final.doc, (2004), 7 pages.

"Meet mimio—The Digital Meeting Assistant", Mayflower Business Systems Limited; http://www.kda.co.uk/mimio1/whiteQaQer.html (May 1999), 10 pages.

"Meeting Center Using Video in Your Meetings"; Retrieved at <<http://www.oucs.ox.ac.uk/webex/Windows/Video.pdf>>, May 13, 2009, 2 pgs.

"Meeting Management Software", Thinking Faster: Ideas, tools and processes to improve personal, workgroup and enterprise productivity and innovation; Retrieved from: <http://workingsmarter.typepad.com/myweblog/2004/12/meeting managem. html> on Oct. 11, 2010, (Dec. 10, 2004), 2 pages.

"Microsoft Office Communicator 2007 Getting Started Guide", retrieved from http://www.ittdublin.ie/media/Media 22233 en.odf (Jul. 2007), 77 pages.

"Microsoft ® Office Live Meeting Feature Guide", Microsoft Corporation, Available at <http://download.microsoft.com/download/8/0/3/803f9 ba6-5e 12-4b40-84d9-d8a91073e3dc/LiveMeeting.doc>,(Jan. 2005), 17 pgs.

Mitrovic, Nikola et al., "Adaptive User Interface for Mobile Devices", retrieved from http://citeseerx.ist.pssu.edu/viewdoc/download?doi=10.1.1.140.4996&rep=rep1 &type=pdf. (2002), 15 pages.

Moran et al., "Tailorable Domain Objects as Meeting Tools for an Electronic Whiteboard"—Published Date: 1998, http://www.fxpal.com/people/chiu/paper-mvc-CSCW98.pdf, 10 pgs.

"Online Calendar & Group Scheduling": MOSAIC Technologies, retrieved from ,http://www.webexone.com/Brandded/ID.asp?brandid=2348&pg=20AppCalendar. On Apr. 29, 2009, 4 pgs.

Peddemors, A.J.H. et al., "Presence, Location and Instant Messaging in a Context-Aware Application Framework", retrieved from htt://citeseerx.ist.psu.edu/viewdoc/download?doi=10.11.1.98.3321 &rep=rep1&type=pdf; 4th International Conference on Mobile Data Manaqement MDM (2003),6 pages.

(56) References Cited

OTHER PUBLICATIONS

"The Platinum Experience of Collaboration—CollaboratorHYPERMAX", Retrieved Date: Jul. 16, 2010, http://www.businessoctane.com/group_telepresence.php, 7 pgs.

Photodex Corporation; "ProShow Producer Feature Overview"; http://www.photodex.com/products/producer/features.html; 2008; 2 Pgs.

Rudnicky, Alexander I., et al., "Intelligently Integrating Information from Speech and Vision to Perform Light-weight Meeting Understanding", retrieved from http://citeseerx.ist.psu.edu/viewdoc/download?doi=10.1.126.1733&rep=rep1&type=pdf. (Oct. 2005), 6 pages.

Shaw, "Create Pan and Zoom Effects in PowerPoint", 2007, Microsoft Corporation, 10 pages.

Thomas, "Through-Walls Collaboration"—Published Date: 2009, http://ieeexplore.ieee.org/stamp/stamp.jsp?tp=&arnumber=5165559, 8 pgs.

Watson, Richard "What is Mobile Presence?", Retrieved from http://reseller.tmcnet.com/topics/unified-communications/articles/54033-what-mobile-presence.htm, (Apr. 10, 2009), 4 pages.

Wempen, F., "PowerPoint 2007 Bible"; Feb. 27, 2007, John Wiley & Sons, 27 pgs. Excerpt.

Weverka, "PowerPoint 2007 All-in-One Desk Reference for Dummies" Jan. 2007, Published by Wiley Publishing, 8 pgs.

Yu, Shoou-Jong et al., "Who Said What When? Capturing Important Moments of a Meeting", retrieved from http://repository.cmu.edu/cgi/viewcontent.cgi?article=1003&context=silicon valley; Technical Report, (Apr. 10-15, 2010),7 pages.

Zenghong, Wu et al., "Context Awareness and Modeling in Self-Adaptive Geo-Information Visualization", retrieved from http://icaci.org/documents/ICC_proceedings/ICC2009/html/refer/17_1.pdf on Aug. 30, 2010, 13 pages.

ZuiPrezi Ltd.; "ZuiPrezi Nonlinear Presentation Editor"; http://zuiprezi.kibu.hu/; 2007; 2 Pgs.

Office Action dated Aug. 12, 2013, in U.S. Appl. No. 13/272,832.

Office Action dated Dec. 30, 2013, in U.S. Appl. No. 13/272,832.

Chinese Fifth Office Action dated May 30, 2014 in Appln No. 200980131157.5, 9 pgs.

Office Action dated Jun. 5, 2014, in U.S. Appl. No. 121965,965.

Office Action dated Jul. 17, 2014, in U.S. Appl. No. 12/968,332.

Office Action dated Jul. 18, 2014, in U.S. Appl. No. 14/225,234.

Office Action dated Jul. 31, 2014, in U.S. Appl. No. 12/473,206.

Office Action dated Aug. 11, 2014, in U.S. Appl. No. 12/184,174, 50 pgs.

Office Action dated Aug. 14, 2014, in U.S. Appl. No. 13/253,886, 17 pgs.

Chinese Office Action dated Nov. 2, 2014 in Appln No. 201210376181.9, 16 pgs.

Office Action dated Sep. 16, 2014, in U.S. Appl. No. 12/472,101, 14 pgs.

Office Action dated Oct. 31, 2014, in U.S. Appl. No. 13/272,832, 17 pgs.

J. Ambrose Little, *High-End Business Intelligence with Data Visualization for WPF 4*, Published Jun. 29, 2010, http://www.codeproject.com/KB/showcase/DataVisualizationWPF4.aspx, 7 pgs.

John Nelson, *Just Around the Corner: Visual Fusion 4.5*, Published Sep. 30, 2009, http://www.idvsolutions.com/press_newsletter_vfx45_silverlight.aspx, 6 pgs.

Hewagamage, et al.,*Interactive Visualization of Spatiotemporal Patterns Using Spirals on a Geographical Map*, Published 1999, http://ieeexplore.ieee.org/stamp/stamp.jsp?arnumber=00795916, 8 pgs.

*Visualize and Map SalesForce Leads with SpatialKey*, Retrieved Jul. 19, 2010, http://www.spatialkey.com/support/tutorials/visualize-and-map-salesforce-leads-with-spatialkey-part-ii/, 8 pgs.

*GeoTime*, Retrieved Jul. 19, 2010, http://www.geotime.com/Product/GeoTime-(1)/Features---Benefits.aspx, 7 pgs.

"Microsoft Word's Click and Type Feature", published by SnipTools, Nov. 12, 2003 downloaded Jun. 28, 2015 from http://sniptools.com/vault/microsoft-words-click-and-type-feature.

"Second Office Action and Search Report Issued in Chinese Patent Application No. 201210382816.6", dated Aug. 26, 2015, 14 Pages.

Karlson, et al., "Courier: A Collaborative Phone-Based File Exchange System"; Technical Report, MSR-TR-2008-05, Jan. 2008.

Grass Roots Software; "FREEPATH-EDU Nonlinear Presentation Software";3 pgs. Retrieved May 13, 2008. http://www.fullcompass.com/product/233150.html.

Werle, et al., "Active Documents Supporting Teamwork in a Ubiquitous Computing Environment"; 4 pgs. In Proceedings of the PCC Workshop (Apr. 3-5, 2001) http://www.pcc.lth.se/events/workshops/2001/pccposters/Werle.pdf.

Office Action dated Sep. 16, 2015, in U.S. Appl. No. 14/272,832, 17 pgs.

Chinese Third Office Action dated Feb. 22, 2016 in Appln No. 201210382816.6, 10 pgs.

Office Action dated Mar. 4, 2016, in U.S. Appl. No. 13/272,832, 27 pgs.

Chinese Office Action dated Feb. 3, 2015 in Appln No. 201210382816.6, 13 pgs.

Office Action dated Apr. 20, 2015, in U.S. Appl. No. 14/272,832, 66 pgs.

Chinese Notice of Allowance dated Nov. 30, 2016, in Appln No. 201210382816.6, 4 pgs.

Fourth Office Action Issued in Chinese Patent Application No. 201210382816.6, dated Sep. 1, 2016, 6 Pages.

"The Screen Capture Tool" by Help and Manual, archived Mar. 13, 1006 by the Internet Wayback Machine, downloaded Nov. 28, 2016 from https://web.archive.org/web/20060313150929/http://www.helpandmanual.com/help/help_toc_html?hm_advanced_tools_capture.

Office Action dated Oct. 4, 2016, in U.S. Appl. No. 13/272,832, 22 pgs.

Office Action dated Mar. 10, 2017, in U.S. Appl. No. 13/272,832, 18 pgs.

\* cited by examiner

INTERACTIVE VISUALIZATION OF MULTIPLE SOFTWARE FUNCTIONALITY CONTENT ITEMS

BACKGROUND

With the assistance of computers, computer systems and a variety of software applications, workers, students and leisure computer users are able to generate a variety of content items, including word processing documents, spreadsheet documents, slide presentations, charts, maps, data tables, photographs, images, and the like. In a typical setting, users may have access to and may interact with a large number of content items. For example, users may interact with a large number of content items as part of collaborative work environment where tens or hundreds of content items are generated and stored. While an outline or diagram may be prepared to help users organize such content items and/or to understand relationships between/among such content items, users are seldom, if ever, able to appreciate the content associated with the variety of content items or to appreciate or understand how the content items may relate to each other.

It is with respect to these and other considerations that the present invention has been made.

SUMMARY

Embodiments of the present invention solve the above and other problems by providing an interactive visualization of multiple software functionality content items. According to embodiments, a variety of content items are associated with each other according to one or more association attributes. Such association attributes may include association of content items relative to a collaborative work space, association of such content items based on time of generation, author, department or organizational designation, metadata applied to such content items, and the like. A presentation of one or more of the content items may be displayed in a visualization interface.

An ordered navigation interface component may be provided to allow navigation of the displayed content items in a moving visualization such that a focused on content item may be displayed in a main or primary display position. As the ordered navigation interface component is navigated in either direction, content items move into the main or primary display position as their respective position in the ordered navigation interface component is approached and ultimately reached. Thus, a user may receive a visualization of each of the content items associated with a given work space or other storage location, and the visualization may be presented on a content item by content item basis in a logical order in association with the ordered navigation interface component.

Organization of content items in association with the ordered navigation interface component may be based on one or more logical attributes. For example, content items may be arranged relative to the ordered navigation interface component based on time of content item creation, time of content item revision, alphabetical order based on author identification, order based on a designated importance parameter, last item viewed, first item viewed, and the like. In addition, content items may be arranged in an order specified by a user.

According to other embodiments, users may interact with each content item displayed in the visualization interface to include providing edits, comments, feedback, and the like.

As such changes occur in a given content item, or as new content items are added, or as existing content items are deleted, relevance indicators may be displayed in association with the ordered navigation interface component to notify users that something has changed with respect to a given content item and to allow users to navigate to the changed content item using the ordered navigation interface component.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
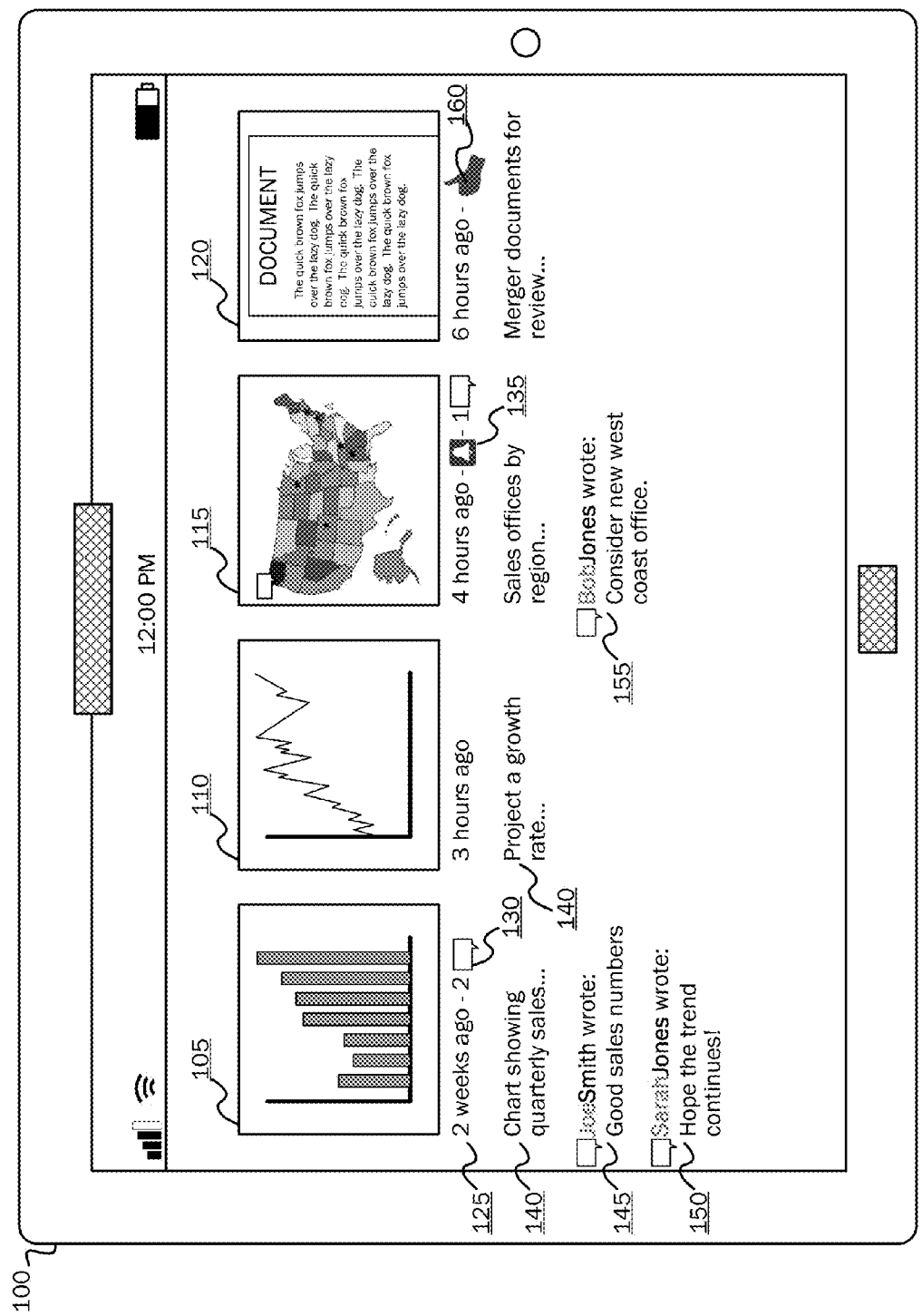
FIG. 1 is a simplified block diagram illustrating a variety of computer-generated content items and associated information displayed on a computer-enabled display surface.

As briefly described above, embodiments of the present invention are directed to interactive visualization of multiple software functionality content items. One or more content items, for example, word processing documents, spreadsheet documents, slide presentation application documents, charts, maps, data tables, photographs, images, and the like, may be assembled together according to a prescribed reason for assembly. For example, the one or more content items may be associated with each other because of the data in the content items. That is, if two content items contain data about the same topic or issue, the two content items may be associated with each other, as described herein. For another example, the one or more content items may be associated with each other owing to their generation and storage with respect to a collaborative work environment, the one or more content items may be associated with each other owing to their storage in a given storage location, and/or the one or more content items may be associated with each other owing to their relationship to one or more prescribed authors, editors, reviewers, or the like. In addition, the one or more content items may be associated with each other owing to a variety of association attributes, for example, time of creation, time of revision, time of interaction with by one or more specified users, geographical location, department or work space association, and the like. That is, one or more content items may be assembled together for visualization as described herein according to any attribute that may be applied to or associated with each content item as desired by users of the content items. For example, a collection of content items may include all maps generated by a maps department covering a specified geographical area, for example, the northwest portion of the United States, or the collection may be comprised of all word processing documents generated by a particular department during a particular time range.

Each content item comprising a collection of one or more content items may be displayed in a visualization interface and in association with an ordered navigation interface. At any given time, one of the one or more content items may be displayed in a main or primary display position. As a user navigates the associated ordered navigation interface component in a forward or backward direction, the display of one or more content items in the visualization interface may move with the navigation of the ordered navigation interface, and as a particular content item is focused on or interacted with via user interaction with the ordered navigation interface component, that content item may be displayed in the main or primary display position.

If desired, any content item displayed in the visualization interface may be interacted with whereby a user may edit, revise, comment on, provide feedback on, and the like with respect to any content item displayed in the visualization interface. As interactions occur with respect to a given content item displayed in the visualization interface, a relevance indicator may be displayed in association with the ordered navigation interface component to notify users that something has occurred with respect to a content item and to allow users to navigate to that content item via the ordered navigation interface component to allow users to review the content item in association with the interaction that has been received for that content item.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. As should be appreciated, user interface components, visualizations of data, and other visualizations of functionalities described herein (as illustrated in FIGS. 1-7) are for purposes of example only and are not limiting of the vast number of visualizations, user interface layouts, data organizations, and the like that may be utilized in accordance with embodiments of the present invention.

FIG. 1 is a simplified block diagram illustrating a computer-generated display on which are displayed various content items assembled together by one or more users. According to embodiments, the computing device 100 may be in the form of a variety of acceptable computing devices, for example, a general purpose computing device, personal computer, a laptop computer, a tablet computer, a slate-type computer, a mobile computer, a hand-held telephonic computer (e.g., mobile telephone or smart phone), a wall-type computing device and or display, and the like.

According to embodiments, the functionalities described herein may be provided by a content visualization application 910, illustrated below with respect to FIGS. 9-11. The content visualization application 910 is operative to assemble a variety of content items in a visualization interface to allow navigation of the content items and to allow interaction with one or more of the content items, as described herein. The content visualization application 910 may be operative to provide all the functionalities described herein as a standalone application operative to receive content items from a variety of local or remote content sources, or the application 102 may be operative to call other software applications for receiving content functionality from one or more other software applications. For example, for displaying and allowing interaction with a word processing type document, the content visualization application 910 may be operative to provide required word processing application functionality, or the content visualization application 910 may be operative to call on a separate word processing application for obtaining the required functionality.

The content items illustrated in FIG. 1 and in FIGS. 2-7, described below, may be entered, edited, or otherwise interacted with according to a variety of input means. Suitable input means include, but are not limited to, keyboard/mouse entry/interaction, touch screen interaction, for example, where a user writes, draws, or otherwise interacts with software application functionality through touching the display screen of the computing device 100, electronic pen/stylus interaction, voice command, wherein for example, a user issues commands to software application functionality or issues voice-based content entry, gesture commands, and the like. According to an embodiment, for purposes of receiving voice-based and gesture-based input, the device 100 may be coupled a microphone operative to capture voice commands, and the device 100 may be coupled a camera operative to record and capture motions and/or gestures made by a user. Such a camera may be operative to provide motion detection capable of detecting movement from users for interpreting the movements as commands for causing changes in application functionality. For example, a camera may comprise a Microsoft® Kinect® motion capture device comprising a plurality of cameras and a plurality of microphones for capturing both motion and voice or other audio information.

The content items 105, 110, 115 and 120, illustrated on the display screen of the computing device 100 are illustrative of a variety of electronic computer-generated or computer-enabled content items, for example, text-based word processing documents, spreadsheet documents, slide presentation slides, Internet-based web pages, electronic maps, charts, images and the like, enabled according to a variety of suitable software applications, for example, word processing applications, spreadsheet applications, slide presentation applications, Internet-based web browsing applications, mapping applications, charting applications, and the like.

As described above, according to embodiments, the content items illustrated in FIG. 1 may be illustrative of a collection of content items associated with a given work space, for example, a collaborative working environment, or otherwise associated with each other via a common storage medium, or the like. The content items illustrated in FIG. 1 may also be associated with each other owing to being linked to each other through a distributed computing environment. For example, each of the content items may have been generated by a given user, and the content items may be linked to each other based on some attribute. For example, each of the content items may have been obtained during a search function conducted by a given user across a variety of Internet-based web sites for information associated with a project with which the user is engaged. The collection of content items illustrated in FIG. 1 may be part of an "insights" information visualization with which a user may assemble one or more content items and associated "insights" information, including descriptive information, comments, feedback, and the like. Such "insights" information may include information stored for or otherwise associated with the generation of one or more data visualizations, as illustrated below with reference to FIGS. 2-7. For example, the "insights" information may include or represent all information contained in a database, server location, spreadsheet, file, or any other collection of one or more content items that may be assembled for generating a data visualization as described herein.

As illustrated in FIG. 1, an example bar graph style chart 105 is illustrated. Underneath the chart 105, interaction information 125 is provided showing that the chart 105 was interacted with according to a prescribed time, for example, "two weeks ago." A comments indicator 130 is also provided showing that one or more comments have been provided in association with the displayed chart 105. A text summary 140 providing summary information about the chart 105 is provided, and a pair of comments 145, 150 is displayed beneath the chart 105 to allow users to review comments that have been made in association with or in application to the displayed chart 105.

Other displayed content items include a graph 110, a map 115, and a document 120. As illustrated in FIG. 1, a variety of information is provided in association with the content items 110, 115, 120. For example, an alert icon 135 is illustrated beneath the map 115 for alerting users that a change of some type may have occurred to the map 115 or to information associated with the map 115. The alert icon 135 may alert users to review the map 115 to learn the nature of changes that may have occurred. A feedback icon 160 is provided in association with the document 120 to indicate that feedback has been provided in association with the document 120 to indicate that one or more reviewing users approves, disapproves, is satisfied with, or is not satisfied with the document 120 or some portion or component of the document 120.

Figure 2:
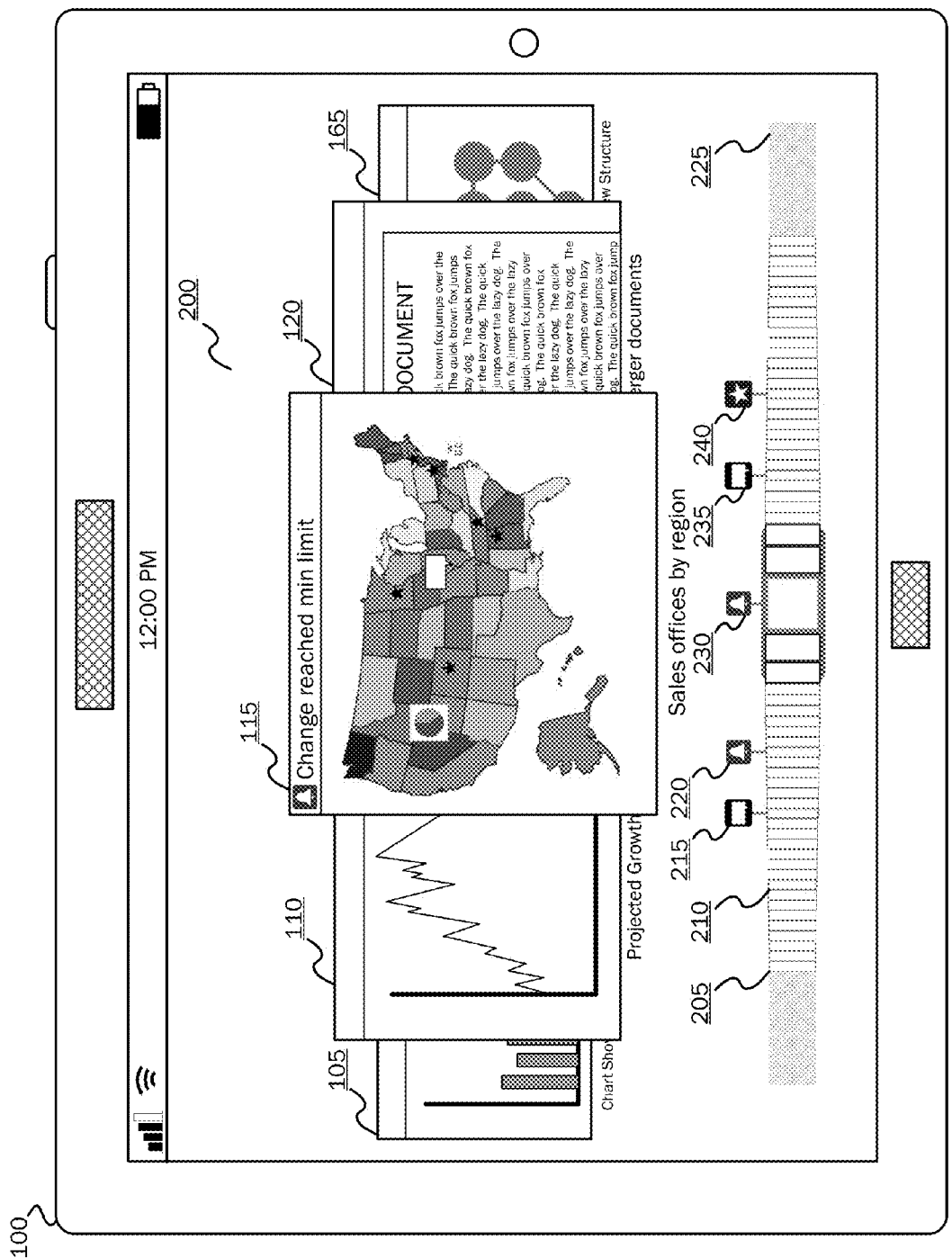
FIG. 2 is a simplified block diagram illustrating a visualization of a variety of content items and an association of the visualization of content items with an ordered navigation interface component.

Referring now to FIG. 2, content items 105, 110, 115, 120, 165 are illustrated as a content visualization in an interactive visualization interface 200. Each of the displayed documents is displayed according to a logical order prescribed by one or more users of the documents. For example, each of the displayed content items may be displayed from left to right in order of time of creation, time of last revision, time of addition to the collection of documents, or according to a variety of other logical ordering attributes. For example, the content items may be ordered in alphabetical order associated with the author or authors of each of the content items. The content items may be ordered according to a categorization, for example, news items first, charts second, maps third, word processing type documents fourth, spreadsheet documents fifth, slide presentation application slides sixth, and so on. Indeed, as should be appreciated, a vast number of different orderings of the content items may be prescribed by one or more users to fit their individual or group needs.

Referring still to FIG. 2, an ordered navigation interface component 205 is provided in the visualization interface 200 for showing a timeline relationship between the content items provided in the visualization interface 200 and for allowing navigation of the content items provided in the visualization interface 200. According to one embodiment, as displayed content items move in either direction, a display of each content item may be changed to indicate its current focus. For example, a content item displayed in a main or primary display position, such as the map 115, may be displayed in a larger display size than other content items. Similarly, as displayed content items move to the far right or far left of the visualization interface 200, for example, the content items 105, 165, those displayed content items may be gradually reduced in size or presentation until they are no longer visible to indicate that those content items have moved outside the present area of review scope being reviewed by the user. As a given content item 105, 165 moves far enough outside of view, it may become grayed out to indicate that it is gradually disappearing from view, and after additional movement along the ordered navigation interface component, a display of the document may be removed altogether. As mentioned above, illustrated user interface components, visualizations of data, and other visualizations of functionalities described herein are for purposes of example only and are not limiting of other manners in which such components, visualizations and data may be presented. For example, the ordered navigation interface component 205 may be disposed vertically instead of horizontally, or along the upper edge of the page instead of the lower edge, and the like.

According to one embodiment, a slider bar 225 is provided with which a user may navigate along the ordered navigation interface 205 in a right/left or forward/backward direction. Interaction with the slider bar 225 may be according to a variety of input means, for example, cursor/mouse interaction, touch interaction, gesture interaction, voice command, and the like. As the slider bar 225 is moved in any direction, the display of content items presented in the visualization interface 200 moves with movement of the slider bar 225. In addition, navigation may occur without use of the slider bar 225. For example, movement of a finger or stylus across the ordered navigation interface component may cause movement of the content items. Alternatively, gesture commands or voice commands may be used to move the content items in either direction.

Referring to FIG. 2, at the present location of the slider bar 225, the content item 115, for example, a map, is associated with the position on the ordered navigation interface of the slider bar 225, and is displayed in a main or primary display position. That is, when the slider bar 225 is positioned in the center of the ordered navigation interface component 205, the corresponding content item at that position on the visualization ordering may be displayed in the center of the visualization interface 200. If the slider bar 225 is moved to the right, then the displayed content item 115 will move to the right and slightly out of view behind the next content item 110 that will move into the main or primary display position at which the content 115 is presently illustrated in FIG. 2. Conversely, if the slider bar 225 is moved to the left, the presently displayed content item 115 may move to the left and slightly out of view, and the document content item 120 will move into the main or primary display position at which the map content item 115 is presently illustrated in FIG. 2.

Thus, each content item associated with the present display of content items, for example, all content items obtained from a collaborative work space storage location, may be navigated across the display of the visualization interface by navigating the ordered navigation interface component such that a content item associated with a present navigation point on the ordered navigation interface component is displayed in a main or primary display location, for example, in the center of the visualization interface 200. As should be appreciated, another location in the visualization interface component may be designated as a main or primary display location. For example, the main or primary display location may be located on a right side of the visualization interface 200, on a left side of the visualization interface component, or the like.

Referring still to the ordered navigation interface component 205, in addition to movement of the slider bar 225 or other movement across the ordered navigation interface component, as described above, navigation of the ordered navigation interface component may be performed by selecting the ordered navigation interface component at a desired location along the visualization ordering. For example, a user may click on, touch, or otherwise interact with a particular location on the ordered navigation interface component 205 to cause navigation to that point on the visualization ordering and to cause display of an associated content item in the main or primary display location in the same manner as would occur if the user moves the aforementioned slider bar to that location on the ordered navigation interface component.

As illustrated in the ordered navigation interface component 205, a number of increment notations 210 may be displayed for providing a scaling associated with the ordered navigation interface component. For example, the space between increment notations 210 may be associated with one week of time, one month of time, one year of time, or the like. Alternatively, the spacing between increment notations 210 may be associated with other attributes, for example, increments along an alphabetical scale from A to Z. As should be appreciated, almost any scaling may be used for the increment notations 210 that allows for navigating along the visualization ordering in a manner that is desirable to the user. For example, the scaling associated with the visualization ordering may simply be based on the number of content items, (e.g., 1-100, 101-201, etc.)

Referring still to the ordered navigation interface component 205, a variety of relevance indicators may be provided in association with the ordered navigation interface component to alert users that a change or other interaction has occurred with respect to a content item available through the visualization interface 200 and associated with the ordered navigation interface component at some prescribed position. For example, a comments indicator 215 is illustrated showing that one or more comments have been provided in a content item associated with a particular position on the ordered navigation interface component. If a user navigates to the position along the ordered navigation interface component associated with the comments indicator 215, the content item, for example, content item 110, may be moved to the main or primary display position, for example, the location of the presently displayed content item 115, to allow the user to review the one or more comments that have been applied to the associated content item 110.

Likewise, navigation to the position on the ordered navigation interface component associated with the comments indicator 235 may allow the user to display a content item associated with the comments indicator 235 to review the one or more comments associated with that content item. Alternatively, a comment or alert may be viewed without navigating to the associated position on the ordered navigation interface component. For example, focusing a mouse or other input means (e.g., finger for a touch display) over the comment or alert indicator may show the comment or alert right away associated with the visualization ordering.

An alert indicator 220, 230 is provided to alert a user that something has occurred with respect to a content item associated with that position along the visualization ordering associated with the ordered navigation interface component 205. For example, if another user associated with a collaborative work space has made a change of some kind to a given document, when the change to the given document is stored, an alert indicator 220, 235 may be displayed at a position along the ordered navigation interface component associated with the document to which a change of some type has occurred. Navigation to that position on the interface component by the user causes a display of the associated content item in the main or primary display position to allow the user to learn the nature of the change that has occurred to the associated content item.

The other indicator 240 is illustrative of a variety of other relevance indicators that may be associated with the ordered navigation interface component 205 for alerting one or more users of an event associated with a content item positioned at that location on the ordered navigation interface component 205. For example, the other indicator 240 could include a variety of icons associated with a variety of events, for example, a calendar icon to illustrate a calendar or time based event, a notes icon to indicate application of one or more notes to a given content item, a document icon to indicate the association of a document with a content item, an avatar to indicate the association of one or more users with a content item, and the like. That is, an almost limitless number of indicators may be utilized and may be displayed along the ordered navigation interface component 205 to indicate a change or other event associated with a content item that may be displayed in the visualization interface 200.

Figure 3:
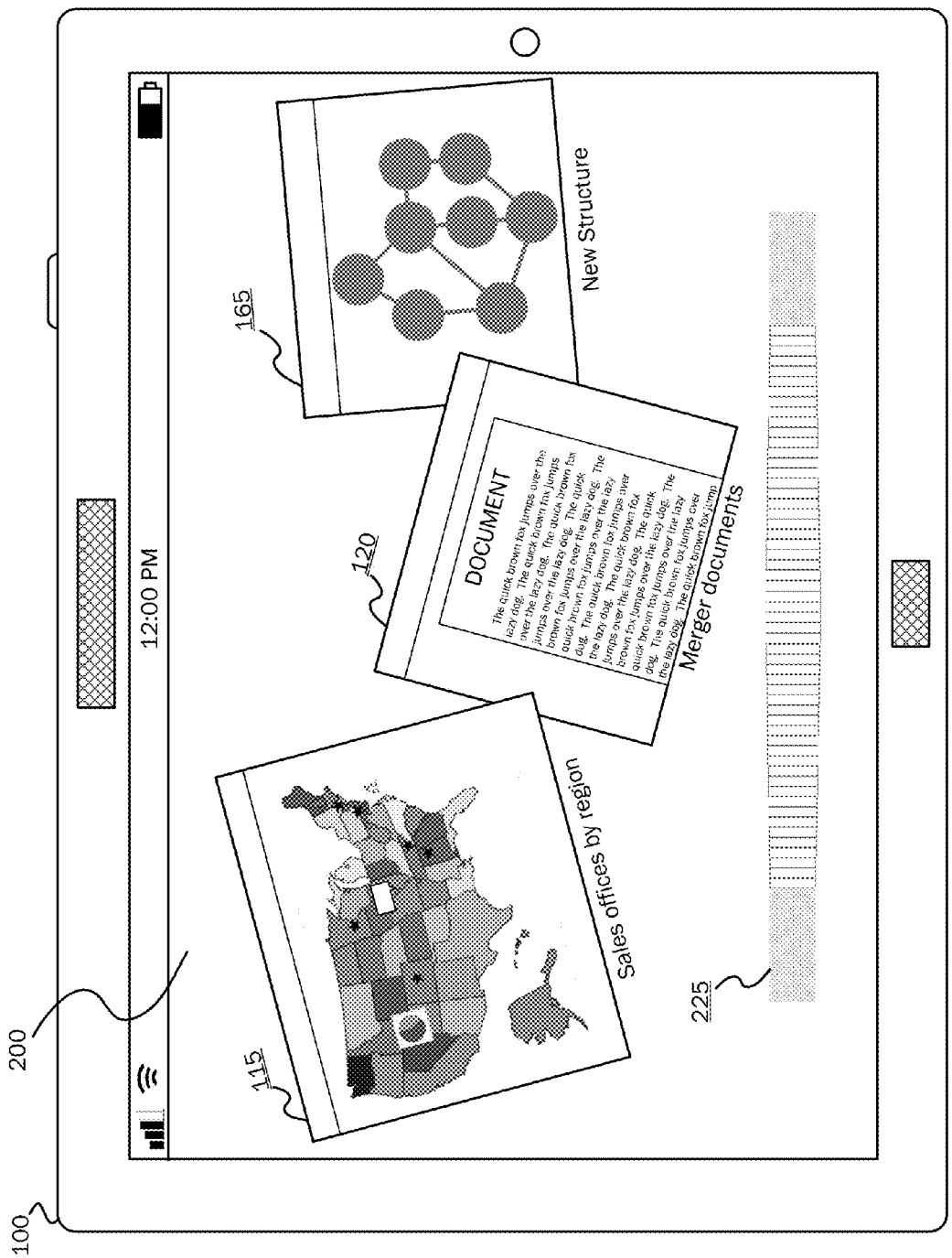
FIG. 3 is a simplified block diagram illustrating a collection of content items in an interactive visualization interface.

Referring now to FIG. 3, as described above, content items presented in the visualization interface 200 may be those content items collected or assembled according to a desired collection or assembly parameter provided by one or more users. For example, the content items that may be presented in the visualization interface 200 may be a part of a collaborative work space, may be stored at a particular server site, may be stored at a particular local server site, may be connected via one or more links to a given project or work space, and the like. Referring still to FIG. 3, according to one embodiment, a collection of content items that may be presented in the visualization interface 200 may be assembled manually by a user by selecting one or more content items for inclusion in a given visualization interface presentation. For example, a menu may be provided to allow a user to select one or more content items that may be assembled together, or a variety of other input means may be utilized. For example, a dialog box may be presented for allowing the user to browse to various storage locations to select content items that will be assembled together into a collection of content items and that may be presented via the visualization interface 200, illustrated above with reference to FIG. 2.

Referring again to FIG. 3, according to another embodiment, the visualization interface 200 may begin as a new visualization interface or "blank slate" onto which one or more content items may be dragged and dropped. As content items 115, 120, 165 are dragged onto a display surface of the visualization interface 200 those items may be displayed according to any prescribed display orientation, for example, the scattered or cluttered display, illustrated in FIG. 3. Once a user defines a prescribed display for the content items dragged onto the visualization interface 200, for example, display in order of time of creation, the content items dragged onto the visualization interface 200 may then be automatically ordered, and displayed according to the prescribed ordering, as illustrated above with reference to FIG. 2.

As should be appreciated, content items likewise may be dragged onto a previously generated visualization, as illustrated in FIG. 2, and the dragged content item may be automatically inserted into an appropriate ordering position relative to other existing content items based on the ordering established for content items displayed according to the given collection of content items. When a content item is added to a collection of content items, or when a content item is deleted from a collection of content items, an indication, for example, an alert 220, 230, illustrated in FIG. 2, may be provided at a position on the ordered navigation interface component 205 at which the content item has been added or at which the content item has been deleted.

Figure 4:
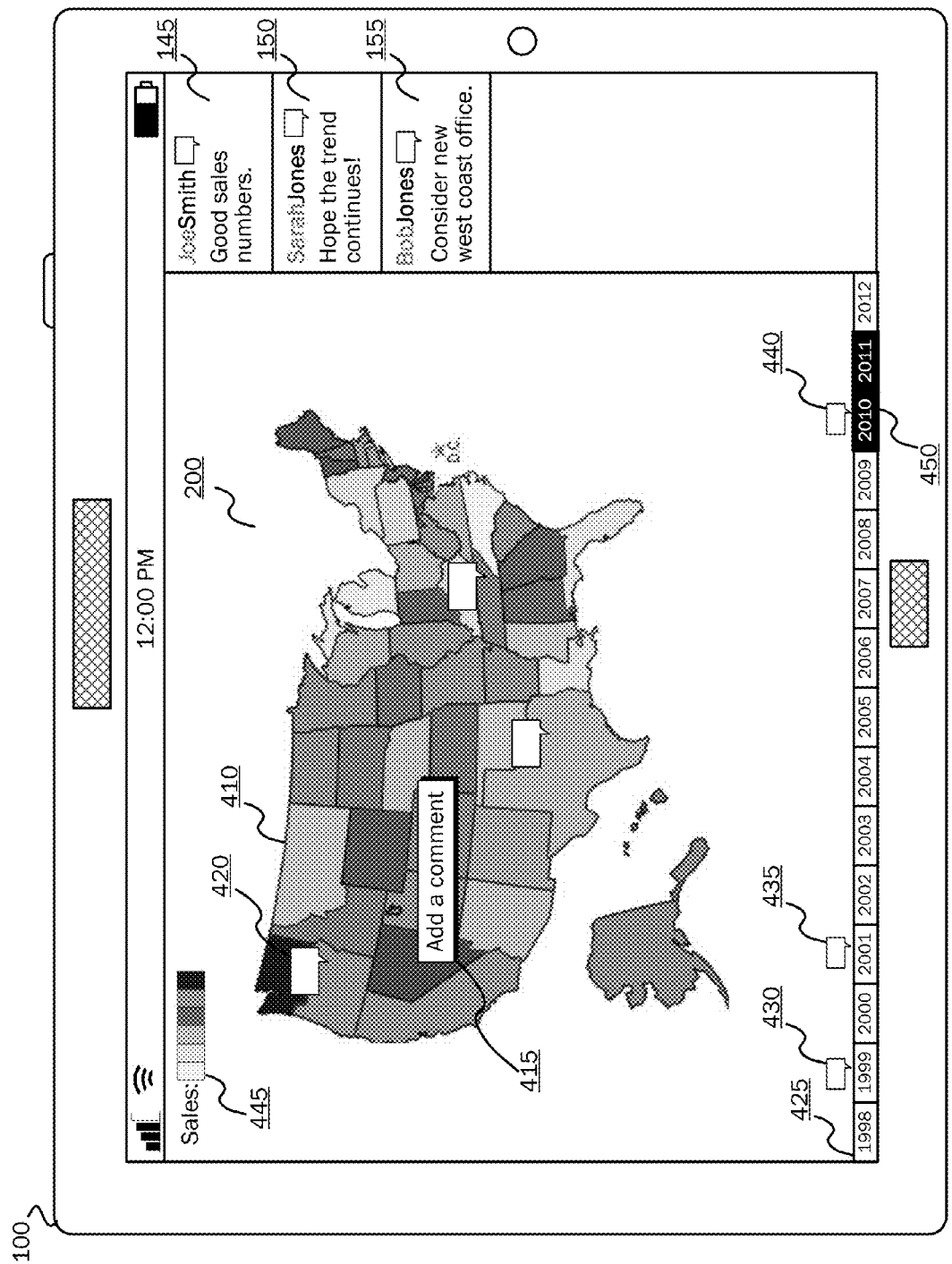
FIG. 4 is a simplified block diagram illustrating a single content item in association with an ordered navigation interface component and showing interaction with the single content item.

Referring now to FIG. 4, interaction with a given content item included in a collection of content items is illustrated. If desired, any content item illustrated in the visualization interface 200, illustrated above with respect to FIG. 2, may be selected for receiving one or more user interactions. As illustrated in FIG. 4, the map content item 115 has been selected and has been displayed in the visualization interface 200 to allow user interaction. For example, a comment may be applied to the displayed content item for providing one or more comments 420 from one or more users associated with the content item. The comments text box 415 may be provided by a comments application associated with the software application functionality associated with the displayed content item, for example, a mapping display application, a word processing application, a spreadsheet application, a slide presentation application, and the like. Alternatively, the functionality for allowing comments to be added to the displayed content item may be provided by the content visualization application 910 as a standalone application, or the content visualization application 910 may be operative for calling a comments application associated with one of the aforementioned software applications for obtaining comments functionality.

According to one embodiment, a user may enter a desired comment into the comments text box 415 in association with some portion or attribute of the displayed content item. For example, referring to the map illustrated in FIG. 4, a user may wish to provide a comment about the user's employer's sales operation in a given region located on the displayed map. According to embodiments, after comments are provided, a comments indicator icon 420 may be positioned on the content item, and subsequent selection of the comments indicator icon 420 may cause a text box such as the text box 415 to be launched to allow a reviewing user to read or add to the associated comment. Alternatively, comments entered for the displayed content item may be displayed in a comments display interface, as illustrated along the right side of the visualization interface 200. As should be appreciated, comments displayed in a comments display interface may be scrolled or otherwise navigated to allow a reviewing user to view all comments associated with the displayed content item as desired.

As described above with reference to FIG. 2, if a comment is added, deleted, or otherwise revised, an indication of the change to the comment may be indicated by a comments indicator 430, 435 positioned along the ordered navigation interface component 205. After a user has completed interaction with the displayed content item, the displayed content item may be dismissed from view, and the content visualization application 910 may return the display of the collection of content items, as illustrated above with reference to FIG. 2.

As should be appreciated, other types of interaction in addition to comments may be provided in association with a given content item 410. For example, if the displayed content item 410 is in the form of a word processing type document, interaction with the word processing document may include addition of text, deletion of text, revision of text, addition or deletion of images or other objects to the document, and the like. Likewise, if the content item 410 is in the form of a spreadsheet application document, interaction with the spreadsheet document may include addition of data, deletion of data, changes to spreadsheet formulas, and the like. Such interactions with a given content item may cause display of an alert 220, 230 or notification 240 along the ordered navigation interface component, as described above.

Referring still to FIG. 4, according to another embodiment, the ordered navigation interface component may be displayed according to a variety of visualization ordering configurations to allow navigation of one or more content items according to a variety of visualization ordering ranges. For example, an ordered navigation interface component 425 illustrated in FIG. 4 is displayed for providing navigation of content items by year. For example, the ordered navigation interface component 425 may allow for navigation to content items contained in or provided via a visualization interface 200 over a span of 20 years. Movement of the slider bar 450, or selection of the ordered navigation interface component at a given point allows for navigation to a prescribed year, in the same manner as described for navigation using the ordered navigation interface component, described above with reference to FIG. 2.

According to embodiments, the ordered navigation interface component illustrated in FIG. 4 may be displayed in association with a particular content item, for example, the map content item illustrated in FIG. 4. According to this embodiment, navigation via the ordered navigation interface component 425 allows navigation of the particular content item to allow a user to review a state of the particular content item at various times along the ordering associated with the ordered navigation interface component. For example, navigation to the year 2000 causes a display of the content item 410 as it existed in the year 2000. Navigation to the year 2010 along the ordered navigation interface component 425 causes a display of the content item as it existed in the year 2010. According to embodiments, when a content item is displayed for a particular navigation point along the ordered navigation interface component 425, comments or other interactive edits, revisions, or changes applied to the displayed content item may be displayed in association with the content item as it existed or as it exists for the navigated visualization ordering point.

For example, a slider bar 450 illustrated in FIG. 4 is positioned at the year 2010 and 2011 along the ordered navigation interface component 425. Because of the positioning of the slider bar 450, interactive content displayed for the example content item 410, for example comments illustrated in the example map, will be associated with interactions applied to the content item during the associated time range. For example, the comments icons 420 and the associated comments, and the display of comments 145, 150, 155 in the comments interface along the right side of the visualization interface 200 will be those comments associated with the content item at the selected visualization ordering point. For another example, if the displayed content item is a word processing type document, navigation to different points along the ordered navigation interface component 425 may allow a user to review states of the document along different points in the associated visualization ordering.

According to embodiments, the user interaction with the visualizations described herein may include authoring and editing. For example, referring still to FIG. 4, an "Add a Comment" tab 415 is illustrated. Selection of the tab 415 may launch a comments entry user interface component for allowing a user to add a comment. Accordingly, the user may add comments to various visualizations of data tied to specific points or positions on a visualization, for example, the map visualization, or the user may add comments tied to a specified time period along the time line for the visualization. Or, the user may add comments tied to both positions on a visualization (e.g., location) and a specified time along the time line for the visualization. Then, if a user is viewing a visualization over time (either through one or more animations associated with the visualization or by moving a slider, such as the slider bar 450), changes in a display of the visualization may show where comments are and when they appear. According to embodiments, a specified time may include a specified time range, for example, 1990-1995, and information, such as comments, may be displayed according to the specified time range.

In addition, as a user navigates to a particular content item in the visualization, for example, a word processing document, spreadsheet document, chart or the like, the user may make edits to the navigated content item within the visualization of content items without having to separately launch those items for making edits. That is, the content items provided in a visualization of content items, as described herein, may be presented as live documents for which edits may be made and saved according to the native application functionality with which those documents were created. According to one embodiment, application functionality associated with such content items may be called and retrieved by the content visualization application 910 as needed, or each content item may be linked back to its native application functionality via a linking means, such as object linking and embedding (OLE).

Figure 5:
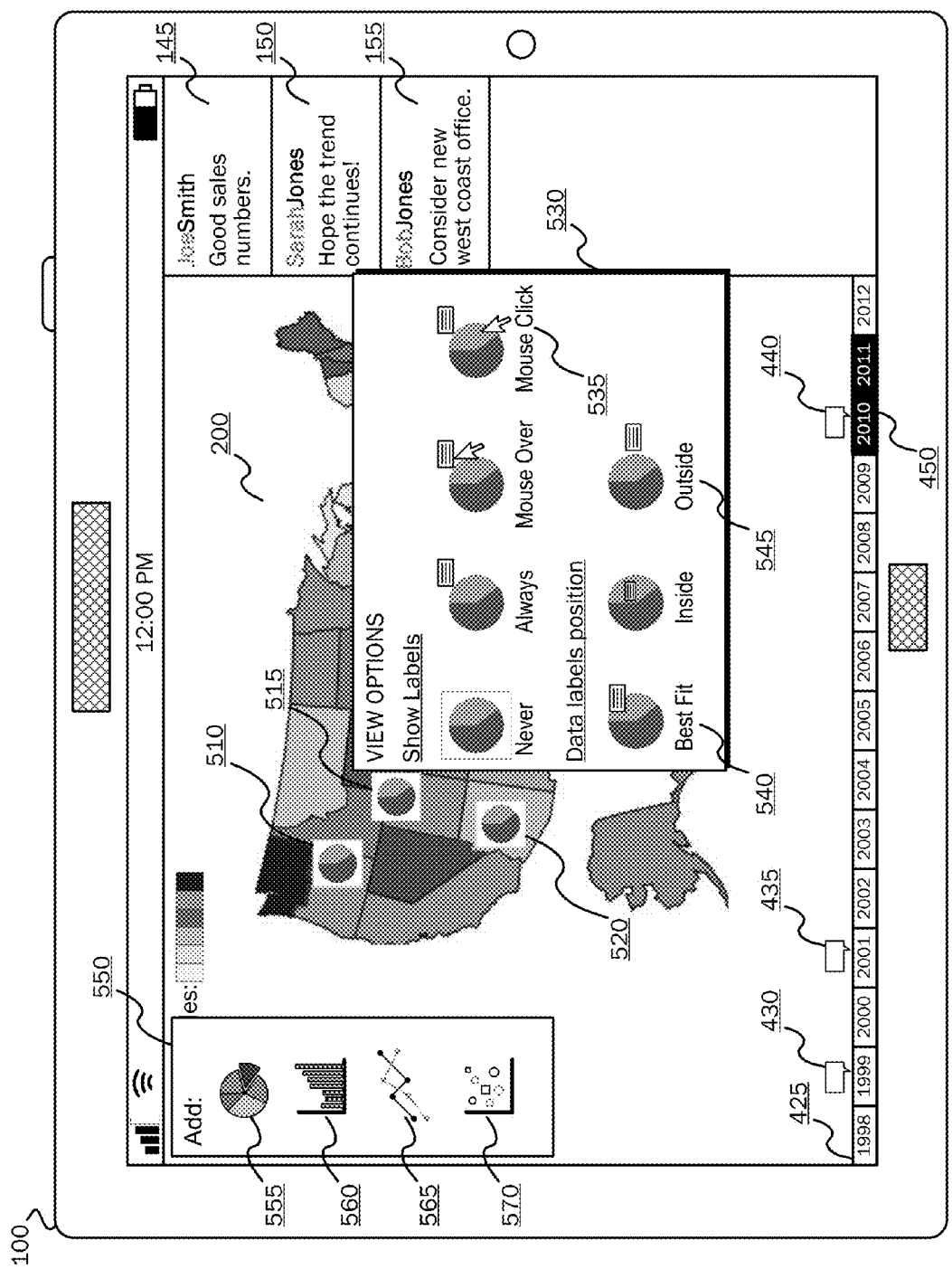
FIG. 5 is a simplified block diagram illustrating a single content item in association with an ordered navigation interface component and showing interaction with the single content item.

Referring now to FIG. 5, interactive application of content items, changes, or other interactions are illustrated. As described above with reference to FIG. 4, information contained in a given content item, for example, a document, a map, a chart, a spreadsheet object, and the like may be revised, added to, deleted from, or otherwise interacted with. And, as illustrated above, interactions with a given content item may result in the inclusion of one or more objects in a displayed item, for example, the comments icons 420, illustrated in FIG. 4. Referring to FIG. 5, user interface components 530, 550 are illustrated for assisting users in applying graphical information to a given content item. For example, a chart adviser interface 550 is illustrated for assisting a user in picking among a variety of possible chart icons 555, 560, 565, 570 that may be applied to a content item for indicating that a chart is available at a location at which the chart icon is displayed on the content item. A view options interface 530 is illustrative of an interface for allowing a user to select viewing options that may be applied to icons that will be displayed on a given content item in association with content associated with the displayed icon.

For example, users associated with a sales organization may wish to annotate a map, such as the map illustrated in FIG. 5, with charts showing quarterly sales information at various locations on the map associated with various sales regions for the sales organization. A chart showing the desired sales information may be applied to the example map content item at a particular location in the same manner as adding a comment to a content item, as described above with reference to FIG. 4. That is, such content (e.g., a chart) may be added via a charts application operating as part of the content visualization application 910 or in association with the content visualization application 910.

An icon 510, 515, 520 may be applied to the example map object for showing the location of the embedded chart. Subsequent selection of one of the chart icons 510, 515, 520 may cause the display of a text box showing the information associated with the displayed and selected icon, or the information associated with the displayed and selected icon may be displayed in an information interface, for example, as illustrated along the right side of the visualization interface 200. As described above with reference to FIGS. 2 and 4, after information for a given content item is changed, for example, the addition of embedded sales information in association with the map displayed in FIG. 5, or even the change of an icon style from one icon style to another icon style, an indication that a change has occurred in the associated content item may be displayed in association with the ordered navigation interface component to alert other users that some type of change has occurred with respect to the associated content item.

Referring still to FIG. 5, a view options menu or gallery 530 is illustrated for allowing a user to dictate or personalize the manner in which display features, such as labels, may be shown and positioned with respect to a displayed object, for example, the map object. For example, under the "Show Labels" section, a user may select that labels for various data points or other information are never shown, are always shown, or are shown in response to user action. For example, a mouse over setting may cause label to appear on the object as the user mouses over or otherwise focuses on a portion of a displayed object containing a label. A mouse click setting 535, may cause labels to be displayed when a user clicks (or engages in another suitable manner, such as touch, voice command or gesture) the displayed object. As should be appreciated, options illustrated in the gallery or menu of options 530 are not limiting of a vast number of display options that may be provided in a gallery or menu of display options 530. For example, in addition to labels and label settings, conditional formatting and other options may be offered such as conditional formatting of content of content items upon mouse over, statistical error ranges data displays, and the like.

Under the "Data Labels Position" section, one or more positions may be selected at which labels will be displayed on a given object. For example, a "Best Fit" option may allow the content visualization application 910 to determine and place a label in a manner that best fits the available display space and that does not cover other information. An "Inside" option may cause all labels to be displayed inside the associated object, and an "Outside" option may cause all labels to be displayed outside the associated object where, for example, it is important that the label not cover displayed information. As should be appreciated, the gallery or menu of options 540 illustrates only a few example display options and should not be considered limiting of a vast number of display options that may be provided in a gallery or menu of display options 540.

Figure 6:
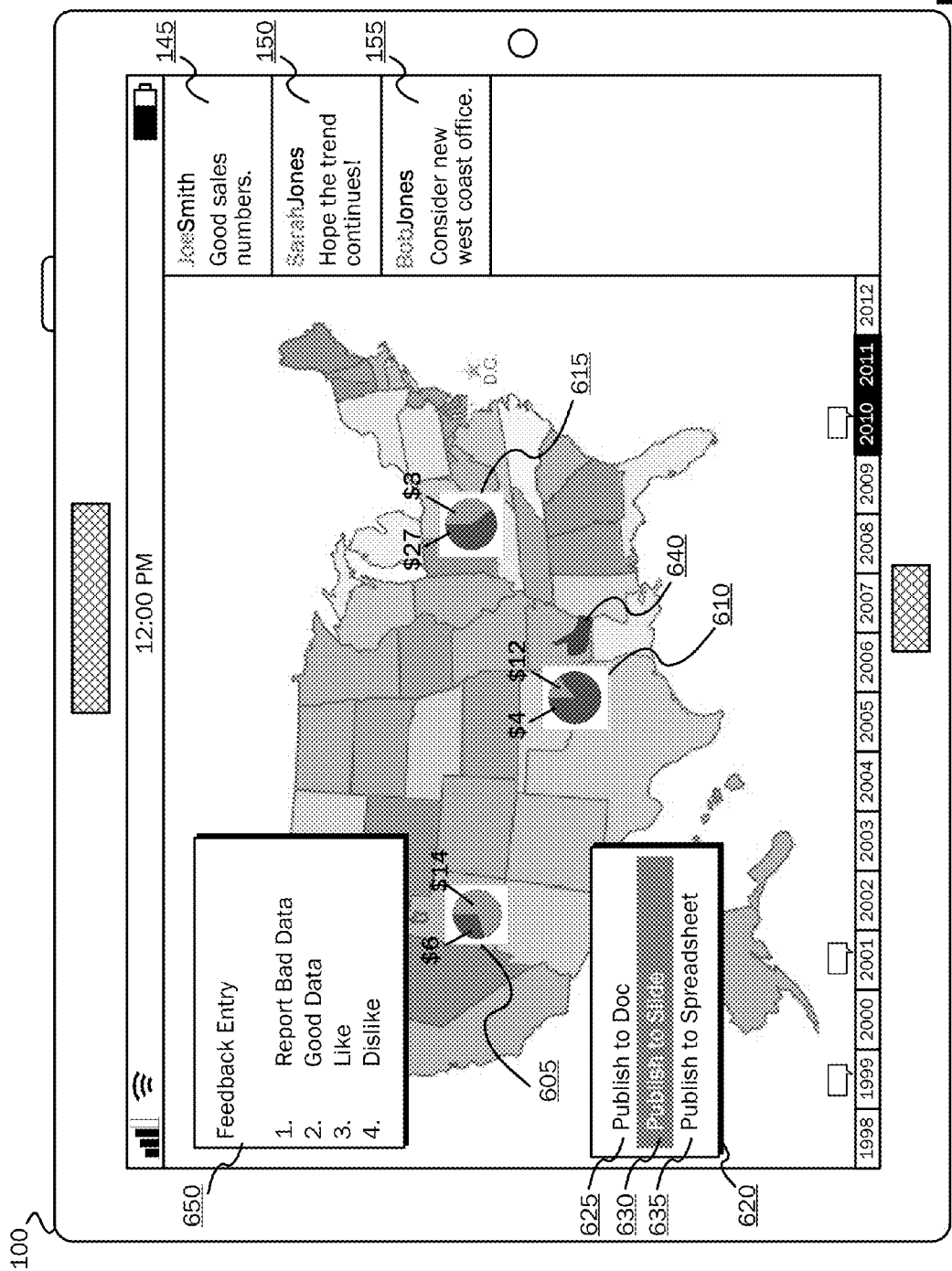
FIG. 6 is a simplified block diagram illustrating a single content item in association with an ordered navigation interface component and showing interaction with the single content item.

Referring now to FIG. 6, a feedback mechanism is illustrated wherein various users may provide feedback in association with information contained in or associated with a given content item. For example, if a number of users having access to the map and associated information illustrated in FIG. 6 are satisfied with the information associated with the chart icon 610, such users may launch a feedback application from the visualization application 910 or in association with the visualization application 910 for allowing the users to enter feedback or to allow the users to simply voice satisfaction, dissatisfaction, approval, disapproval, and the like. If users enter feedback commentary, the feedback commentary may be associated with the content item, and a feedback icon 640 may be provided for both alerting other users of the presences of the feedback or for allowing other users to select the feedback icon 640 to review the feedback commentary provided by other users having access to the content item.

According to embodiments, feedback may be provided by users on the data contained in objects displayed in the visualization of objects, as well as, on the nature and quality of the visualization itself As illustrated in FIG. 6, a feedback entry menu or dialog 650 is illustrated from which users may select a variety of feedback items to associate with a data item or data visualization. The items listed in the menu/dialog 650 are for purposes of example only and are not limiting of other feedback items that may be applied. For example, the comments and feedback user interface component 650 may be launched in association with any position along the visualization ordering for providing feedback or comments on the visualization of data and other objects or to provide feedback or comments on the actual data or objects.

A menu or gallery of feedback items, as illustrated in the UI component 650, may be provided to allow a user to select from one of a number of feedback options. For example, a user may apply a feedback item of "Report Bad Data" to a chart object displayed in the visualization to alert others that the user believes the data is inaccurate, misleading or otherwise not acceptable. According to one embodiment, if such a feedback item is applied to a given data item, that data item may be removed or hidden from the visualization. As should be appreciated, use of such feedback for a given object may be limited to users having permissions to apply such feedback that may result in a removal or hiding of a data item or content item from the visualization.

If users provide a simple approval, disapproval, satisfaction, dissatisfaction type of feedback, the icon 640 may be displayed in a manner to provide an immediate indication of such feedback. For example, if ten users approve of the content item or associated information, an approval icon 640, for example, a "thumbs up," "smiley face," "happy avatar," or the like may be displayed along with a number associated with the number of approving feedback providers, for example, the number "10" displayed below, above, or adjacent to the feedback icon 640. In contrast, if a number of users disapprove, or are dissatisfied with the content item or the information associated with a particular content item, then a disapproving or dissatisfaction icon, for example, a "thumbs down," a "frowning face," a "unhappy avatar" or the like may be provided along with a number associated with the number of feedback providers providing negative feedback. As should be appreciated, feedback provided by one or more feedback providers may be provided in a feedback interface, as displayed along the right side of the visualization interface 200, in the same manner as comments or other information may be provided.

Referring still to FIG. 6, information applied to a given content item, for example, text, comments, feedback, images, charts, objects, photographs, and the like may be published from an associated content item to other types of software application content items. Referring to the user interface component 620, information associated with a given content item may be published to a document, for example, a word processing type document, a slide, for example, a slide presentation application slide, a spreadsheet document, for example, a spreadsheet application document, and the like. Selectable controls 625, 630, 635 may be provided in the user interface component 620 for allowing a user to publish information associated with a given content item. As should be appreciated, the content visualization application 910 may be operative to publish the desired information to the desired content type, or the content visualization application 910 may be operative to call other software applications, for example, a word processing application for passing the information to the other application for publishing the information to the desired content type, for example, a word processing application document.

Figure 7:
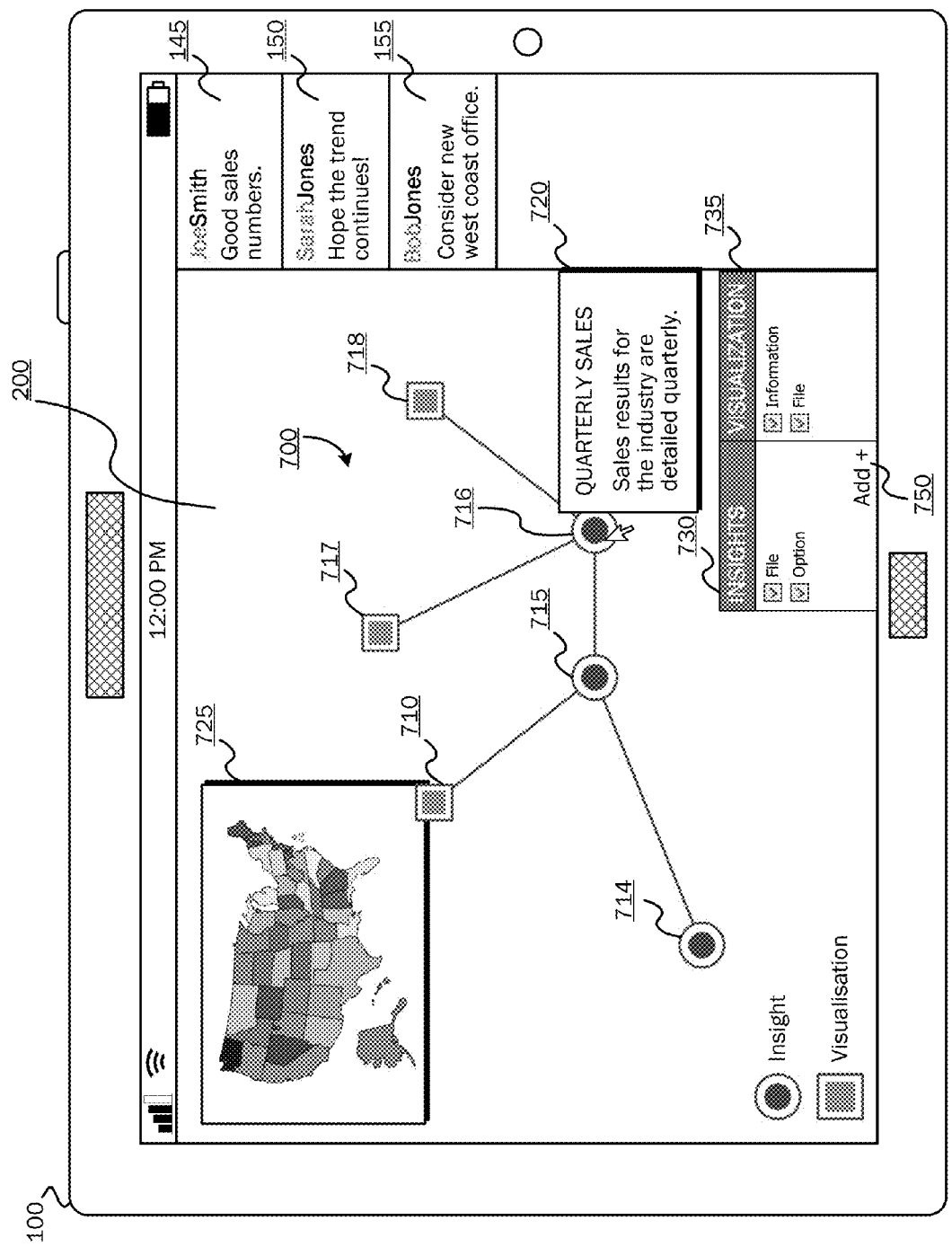
FIG. 7 is a simplified block diagram illustrating a content item visualization path and associated information.

Referring to FIG. 7, an information path may be displayed in the visualization interface 200 showing a logical relationship between visualizations 710, as illustrated above with reference to FIGS. 2-6, and insights information 715, as illustrated above with reference to FIG. 1. As mentioned above, "insights" information may include information stored for or otherwise associated with the generation of one or more data visualizations, as illustrated with reference to FIGS. 2-7. For example, the "insights" information may include or represent all information contained in a database, server location, spreadsheet, file, or any other collection of one or more content items that may be assembled for generating a data visualization as described herein. According to an embodiment, the mapping of visualization information 710 and insights information 715 may be generated in association with a path taken by one or more users through the various content items contained in or associated with visualizations, as illustrated above with reference to FIGS. 2-6, and insights information, as illustrated above with respect to FIG. 1. Alternatively, the mapping 700 may be organized where a central path is provided between various insights information, and wherein branches off the central path to visualizations 710 are provided in association with nodes 715 associated with particular insights information.

For example, the node 715 may be illustrative of a collection or storage of insights information, illustrated in FIG. 1, and the visualization node 710 may be illustrative of the visualization, illustrated in FIG. 2, generated from the content contained in the insights information, illustrated in FIG. 1. The visualization 725 may be illustrative of a visualization of a given content item contained in the visualization illustrated in FIG. 2. For example, the node 716 may be associated with an insights file or storage location containing 50 content items. The node 717 may be associated with a first visualization associated with 25 of the 50 items, and the node 718 may be associated with a second visualization comprised of 25 other content items of the insights file 716.

According to one embodiment, a particular path traversed by a given user, for example, from node 714 to node 715 to node 710 may be highlighted to show a path traversed by one user, as opposed to a path traversed by a second user. For example, a path traversed by one user may be highlighted in the color red, a path traversed by a second user may be highlighted in the color blue, and so on. According to embodiments traversal or review of a particular path or items associated with a particular path may be performed in a number of ways as desired by one or more users. A given path may be traversed by a user wherein he/she views one or more visualizations associated with various insights items. For example, if a user views visualization 710 followed by visualization 717, then a traversal path may be generated showing movement along a path through nodes 715 and 716. For another example, the visualizations themselves or the insights themselves may be linked (e.g., when looking at node 715, the user sees a list of related insights 714 and 716). For another example, a path may be computed algorithmically based on similarities between different insights or visualizations (e.g., all insights with geographical data might be linked together and insights with geographical data from the same region might branch off each other).

A pair of user interface components 730 and 735 may be provided for interacting with a given insights file or visualization file to include adding additional insights files or visualization files. That is, the files, options, and information illustrated in the UI components 730, 735 is illustrative of any of a variety of data, information, content items, and the like that may be applied to the mapping illustrated in FIG. 7 or to individual nodes of the mapping 700. As should be appreciated, the mapping 700 may be a mapping of content across a variety of storage locations located on a local storage medium, located on a remote storage medium, or located across disparate storage mediums accessed via a distributed computing network, for example, the Internet.

According to embodiments, the insights/visualization menus 730/735 may include a most frequently used set of information or options used in association with a given insight or visualization. For example, if a user has access to a large database with a large number of database columns, the UI component 730/735 may be used to show a list of the most common columns used from the database in the generation of a given insight or visualization. Thus, the generation of visualizations from the example database may be simplified by allowing the user a quick reference of those columns of data most used by the user. In addition, information may be provided via the UI components 730, 735 about which users have interacted with (e.g., viewed, copied from, etc.) a given insight or visualization. By generating a social graph of people that have used a specific insight or visualization, other users, for example, an author of a given insight or visualization, may have more confidence in that insight or visualization (or less confidence if the insight or visualization is never or seldom used).

Figure 8:
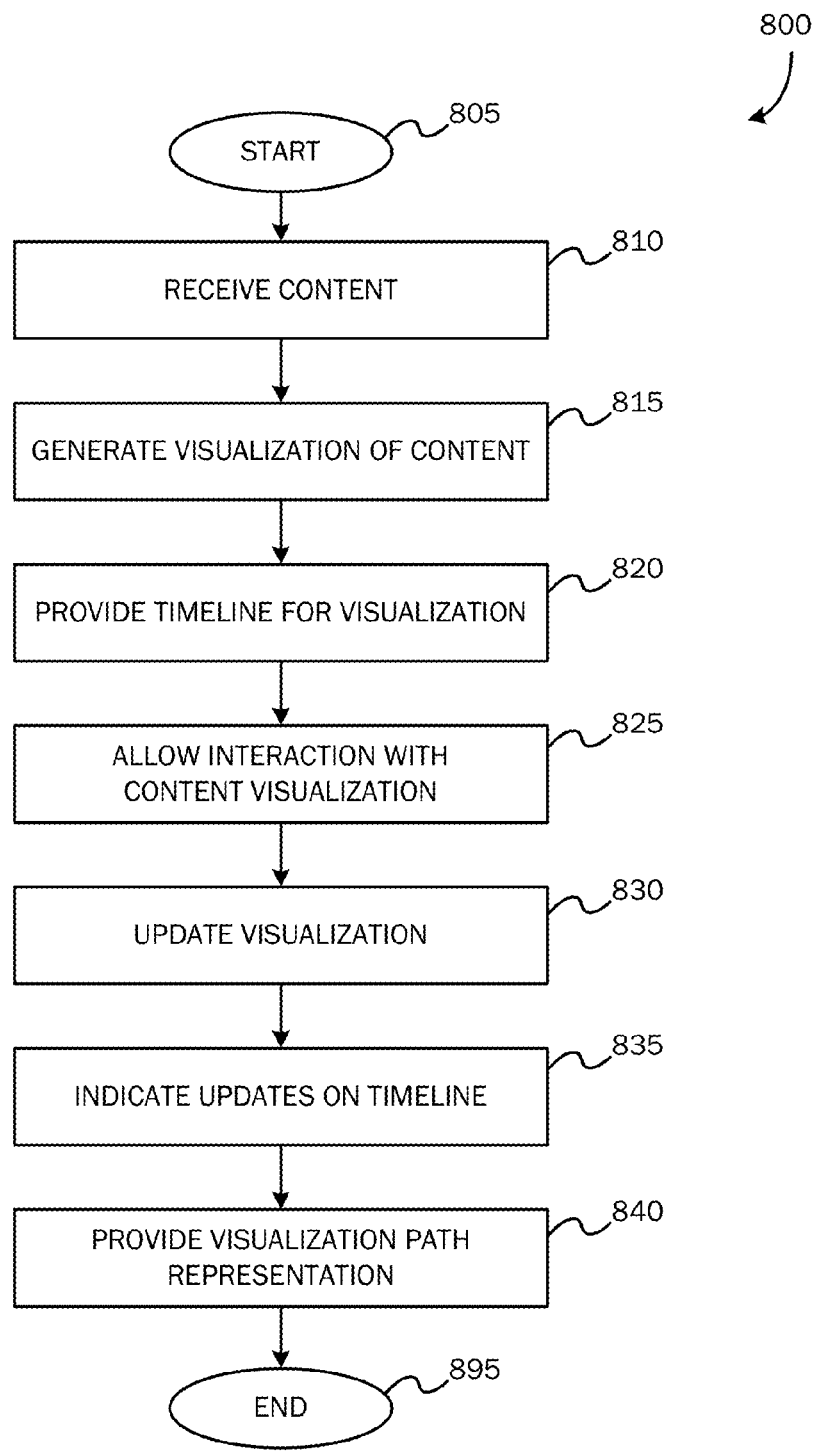
FIG. 8 is a flowchart illustrating a method for providing and for allowing interaction with a visualization of one or more computer-generated content items.

Having described a system architecture for providing an interactive visualization of multiple functionality content items, FIG. 8 is a flowchart illustrating a method for providing and for allowing interaction with a visualization of one or more computer-generated content items. The routine 800 begins at start operation 805 and proceeds to operation 810 where one or more content items may be received by the visualization application 910 with which a visualization may be generated, as described above with reference to FIG. 2. As should be appreciated, the one or more content items may be received according to a variety of methods, described herein, including manual selection or designation of content items, as described above with reference to FIG. 3, by selecting all content items stored in association with a given collaborative work space, by selecting content items linked to each other via a distributed computing network, for example, the Internet, and the like. According to one embodiment, the received content items may include one or more content items and associated information assembled or stored in association with an insights file, as illustrated and described above with reference to FIG. 1.

At operation 815, a visualization of one or more content items may be generated, as described above. As should be appreciated, a number of visualizations may be generated from different subsets of content items associated with a given content item storage medium. For example, a given collaborative work space may include 50 content items associated with a given project. A first visualization may be generated for ten of the content items, a second visualization may be generated for ten other content items, and so on. For example, each of the visualizations may be associated with different aspects of the project. For example, a first visualization may be associated with a development stage for a software application development process, a second visualization may be prepared with content items associated with a production stage, and a third visualization may be generated with content items associated with a sales stage of the project. For another example, a first visualization may be generated for ten of the 50 content items, and then a second visualization may be generated from the same ten content items using different data from the ten content items or using a different visualization from the example ten content items.

At operation 820, a visualization ordering for the generated visualization may be generated, and an associated ordered navigation interface component may be generated and displayed in a visualization interface in association with a display of one or more content items associated with a visualization for which the visualization ordering is generated. At operation 825, interaction with content items contained in a given visualization is allowed. As described above with reference to FIGS. 4-7, interaction may include the application of comments, feedback and edits to one or more content items contained in a given visualization, as well as, the addition of new content items or the deletion of existing content items.

At operation 830, the visualization may be updated in association with interaction with one or more content items contained in the visualizations. For example, new content items may be displayed in the visualization, deleted content items may be removed from the visualization, ordering of displayed content items may be changed, and the like. At operation 835, an indication of updates to content items through interaction with the visualization may be provided in association with the ordered navigation interface component. For example, if comments are applied to a given content item, then a comment indicator may be provided in association with the ordered navigation interface component to notify a user that a comment has been added to a content item and to allow the user to navigate to the content item via the ordered navigation interface component 205 to allow the user to review the comment that has been applied to the associated content item.

At operation 840, a mapping 700 may be provided, as described and illustrated above with reference to FIG. 7, to allow a review of various review and/or editing paths taken by one or more users through one or more insights files and/or associated visualizations. For example, a path may be provided in a mapping illustrating navigation from one content item to another content item during a given navigation session performed in association with a plurality of content items contained in one or more insights or visualizations. The routine ends at operation 895.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 9-11 and the associated descriptions provide a discussion of a variety of operating environments in which embodiments of the invention may be practiced. However, the devices and systems illustrated and discussed with respect to FIGS. 9-11 are for purposes of example and illustration and are not limiting of a vast number of computing device configurations that may be utilized for practicing embodiments of the invention, described herein.

Figure 9:
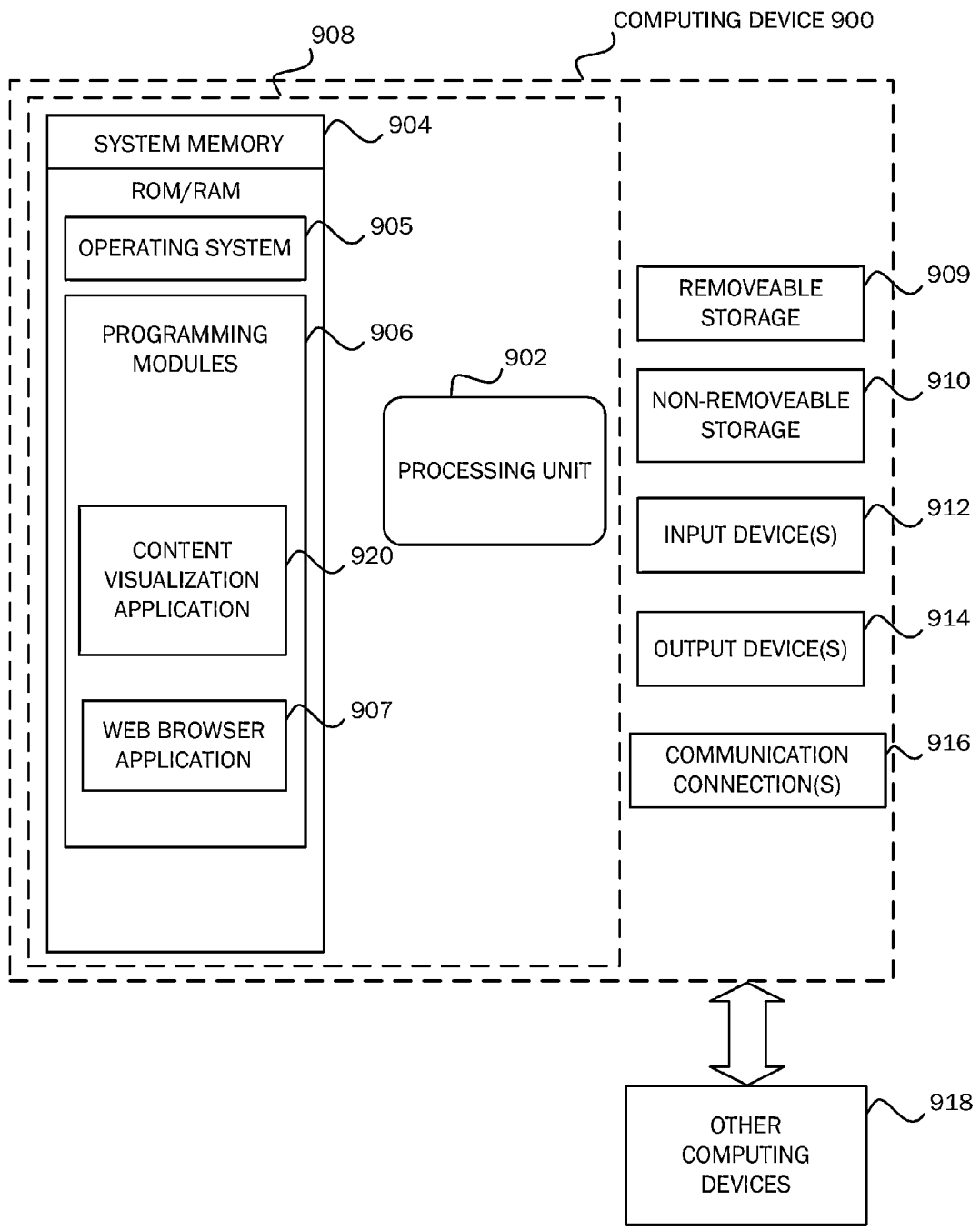
FIG. 9 is a simplified block diagram of a computing device with which embodiments of the present invention may be practiced.

FIG. 9 is a block diagram illustrating example physical components of a computing device 900 with which embodiments of the invention may be practiced. The computing device components described below may be suitable for the computing devices described above, for example, the computing device 100. In a basic configuration, computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination. System memory 904 may include operating system 905, one or more programming modules 906, and may include the content visualization application 920. Operating system 905, for example, may be suitable for controlling computing device 900's operation. Furthermore, embodiments of the invention may be practiced in conjunction with a graphics library, other operating systems, or any other application program and is not limited to any particular application or system. This basic configuration is illustrated in FIG. 9 by those components within a dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910.

As stated above, a number of program modules and data files may be stored in system memory 904, including operating system 905. While executing on processing unit 902, programming modules 906, such as the content visualization application 910 may perform processes including, for example, one or more method 800's stages as described above. The aforementioned process is an example, and processing unit 902 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the content visualization application 910 may be operated via application-specific logic integrated with other components of the computing device/system 900 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 904, removable storage 909, and non-removable storage 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 912 such as a keyboard, a mouse, a pen, a sound input device, a touch input device, etc. Output device(s) 914 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
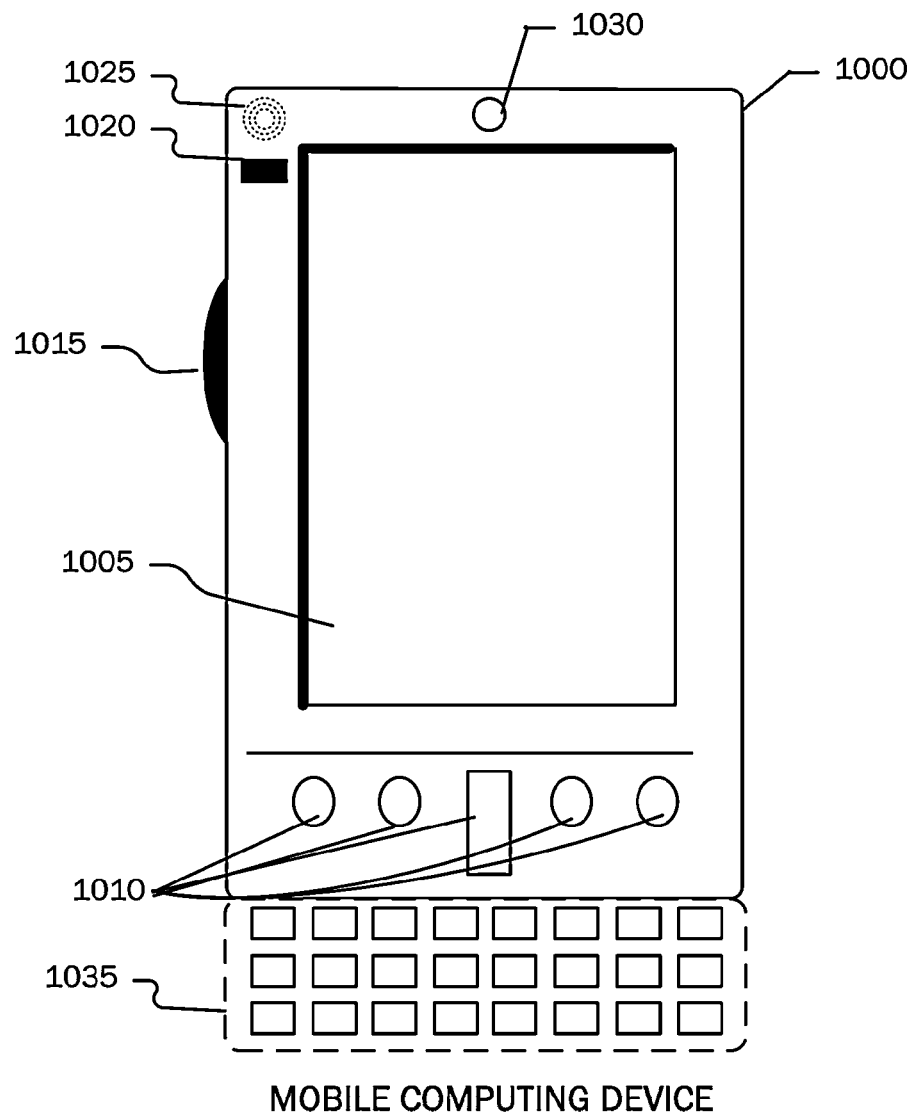
FIGS. 10A and 10B are simplified block diagrams of a mobile computing device with which embodiments of the present invention may be practiced.
Figure 10B:
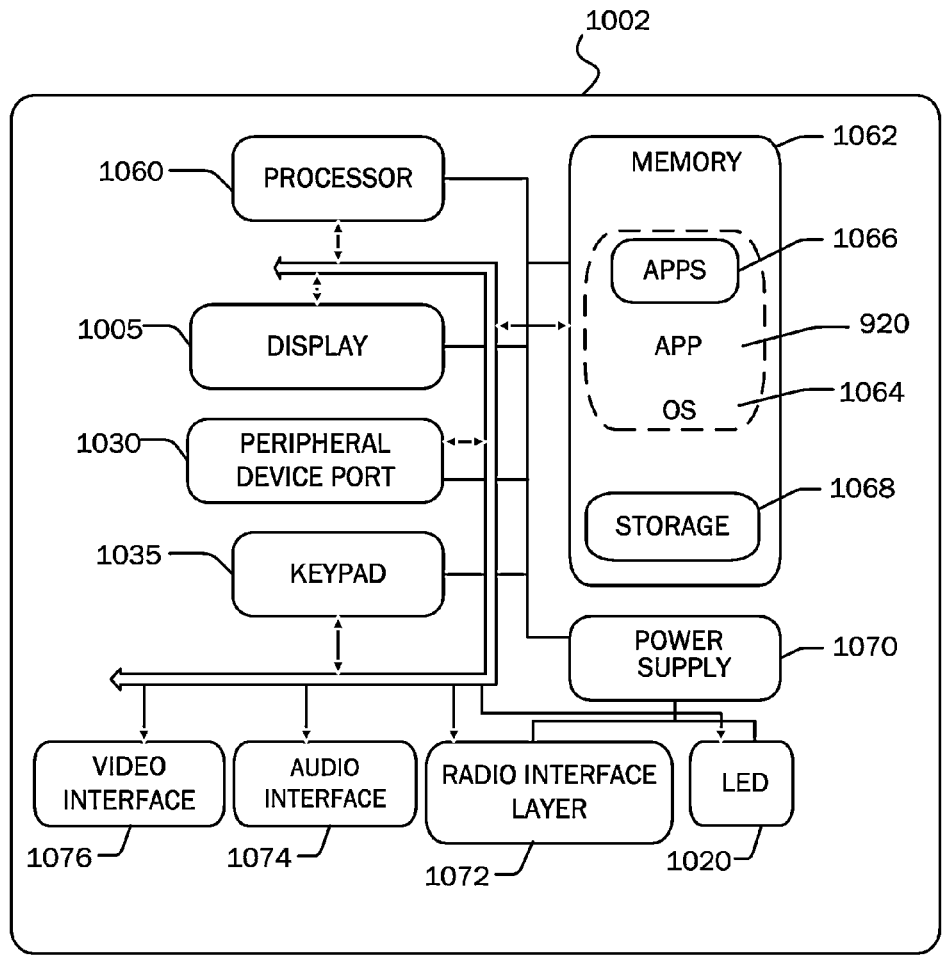

FIGS. 10A and 10B illustrate a suitable mobile computing environment, for example, a mobile telephone 1000, a smart phone, a tablet personal computer, a laptop computer, and the like, with which embodiments of the invention may be practiced. With reference to FIG. 10A, an example mobile computing device 1000 for implementing the embodiments is illustrated. In a basic configuration, mobile computing device 1000 is a handheld computer having both input elements and output elements. Input elements may include touch screen display 1005 and input buttons 1015 that allow the user to enter information into mobile computing device 1000. Mobile computing device 1000 may also incorporate an optional side input element 1015 allowing further user input. Optional side input element 1015 may be a rotary switch, a button, or any other type of manual input element. In alternative embodiments, mobile computing device 1000 may incorporate more or less input elements. For example, display 1005 may not be a touch screen in some embodiments. In yet another alternative embodiment, the mobile computing device is a portable phone system, such as a cellular phone having display 1005 and input buttons 1010. Mobile computing device 1000 may also include an optional keypad 1035. Optional keypad 1035 may be a physical keypad or a "soft" keypad generated on the touch screen display.

Mobile computing device 1000 incorporates output elements, such as display 1005, which can display a graphical user interface (GUI). Other output elements include speaker 1025 and LED light 1020. Additionally, mobile computing device 1000 may incorporate a vibration module (not shown), which causes mobile computing device 1000 to vibrate to notify the user of an event. In yet another embodiment, mobile computing device 1000 may incorporate a headphone jack (not shown) for providing another means of providing output signals.

Although described herein in combination with mobile computing device 1000, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 10B is a block diagram illustrating components of a mobile computing device used in one embodiment, such as the computing device shown in FIG. 10A. That is, mobile computing device 1000 can incorporate system 1002 to implement some embodiments. For example, system 1002 can be used in implementing a "smart phone" that can run one or more applications similar to those of a desktop or notebook computer such as, for example, browser, e-mail, scheduling, instant messaging, and media player applications. In some embodiments, system 1002 is integrated as a computing device, such as an integrated personal digital assistant (PDA) and wireless phone.

One or more application programs 1066 may be loaded into memory 1062 and run on or in association with operating system 1064. Examples of application programs include phone dialer programs, e-mail programs, PIM (personal information management) programs, word processing programs, spreadsheet programs, Internet browser programs, messaging programs, and so forth. System 1002 also includes non-volatile storage 1068 within memory 1062. Non-volatile storage 1068 may be used to store persistent information that should not be lost if system 1002 is powered down. Applications 1066 may use and store information in non-volatile storage 1068, such as e-mail or other messages used by an e-mail application, and the like. A synchronization application (not shown) also resides on system 1002 and is programmed to interact with a corresponding synchronization application resident on a host computer to keep the information stored in non-volatile storage 1068 synchronized with corresponding information stored at the host computer. As should be appreciated, other applications may be loaded into memory 1062 and run on the device 1000, including the content visualization application 910, described herein.

System 1002 has a power supply 1070, which may be implemented as one or more batteries. Power supply 1070 might further include an external power source, such as an AC adapter or a powered docking cradle that supplements or recharges the batteries.

System 1002 may also include a radio 1072 that performs the function of transmitting and receiving radio frequency communications. Radio 1072 facilitates wireless connectivity between system 1002 and the "outside world", via a communications carrier or service provider. Transmissions to and from radio 1072 are conducted under control of OS 1064. In other words, communications received by radio 1072 may be disseminated to application programs 1066 via OS 2064, and vice versa.

Radio 1072 allows system 1002 to communicate with other computing devices, such as over a network. Radio 1072 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1002 is shown with two types of notification output devices; LED 1020 that can be used to provide visual notifications and an audio interface 1074 that can be used with speaker 1025 to provide audio notifications. These devices may be directly coupled to power supply 1070 so that when activated, they remain on for a duration dictated by the notification mechanism even though processor 1060 and other components might shut down for conserving battery power. LED 1020 may be programmed to remain on indefinitely until the user takes action to indicate the powered-on status of the device. Audio interface 1074 is used to provide audible signals to and receive audible signals from the user. For example, in addition to being coupled to speaker 1025, audio interface 1074 may also be coupled to a microphone to receive audible input, such as to facilitate a telephone conversation. In accordance with embodiments of the present invention, the microphone 920 may also serve as an audio sensor to facilitate control of notifications, as will be described below. System 1002 may further include video interface 1076 that enables an operation of on-board camera 1030 to record still images, video stream, and the like.

A mobile computing device implementing system 1002 may have additional features or functionality. For example, the device may also include additional data storage devices (removable and/or non-removable) such as, magnetic disks, optical disks, or tape. Such additional storage is illustrated in FIG. 10B by storage 1068. Computer storage media may include volatile and nonvolatile, removable and non-removable media implemented in any method or technology for storage of information, such as computer readable instructions, data structures, program modules, or other data.

Data/information generated or captured by the device 1000 and stored via the system 1002 may be stored locally on the device 1000, as described above, or the data may be stored on any number of storage media that may be accessed by the device via the radio 1072 or via a wired connection between the device 1000 and a separate computing device associated with the device 1000, for example, a server computer in a distributed computing network, such as the Internet. As should be appreciated such data/information may be accessed via the device 1000 via the radio 1072 or via a distributed computing network. Similarly, such data/information may be readily transferred between computing devices for storage and use according to well-known data/information transfer and storage means, including electronic mail and collaborative data/information sharing systems.

Figure 11:
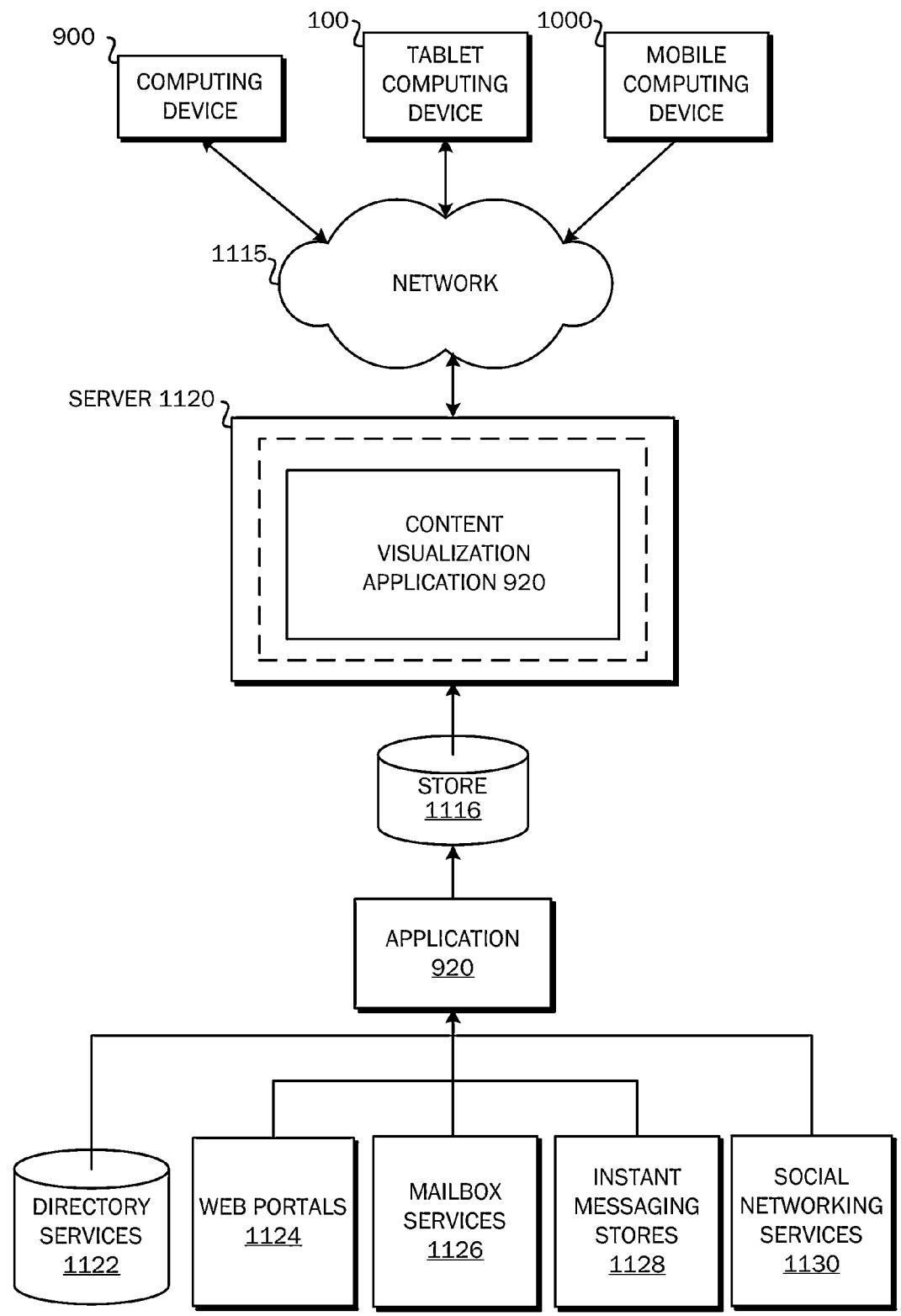
FIG. 11 is a simplified block diagram of a distributed computing system in which embodiments of the present invention may be practiced.

FIG. 11 illustrates a system architecture for providing content visualizations to one or more client devices, as described above. Content developed, interacted with or edited in association with a content visualization application 910 may be stored in different communication channels or other storage types. For example, various content items along with information from which they are developed may be stored using directory services 1122, web portals 1124, mailbox services 1126, instant messaging stores 1128 and social networking sites 1130. The content visualization application 910 may use any of these types of systems or the like for enabling content utilization, as described herein. A server 1120 may provide content visualizations to clients. As one example, server 1120 may be a web server providing content visualizations over the web. Server 1120 may provide online content visualizations over the web to clients through a network 1115. Examples of clients that may obtain content visualizations include computing device 900, which may include any general purpose personal computer, a tablet computing device 100 and/or mobile computing device 1000 which may include smart phones. Any of these devices may obtain content from the store 1116.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of providing a computer-generated visualization of electronic content items, comprising:
    receiving a plurality of content items from a data store;
    displaying a portion of the plurality of content items on a visualization surface in a sequential order across the visualization surface, wherein a content item of the plurality of content items is displayed in a primary display position;
    displaying on the visualization surface an ordered navigation interface for providing navigation of the display of the portion of the plurality of content items, the ordered navigation interface including a plurality of arrangement options, each arrangement option being associated with a respective subset of the plurality of content items that are associated with a same respective attribute corresponding to the arrangement option;
    receiving a request to edit the content item displayed in the primary display position;
    in response to receiving the request, providing application functionality within the visualization surface to edit the content item displayed in the primary display position without separately launching an application having the application functionality; and saving the content item to the data store.

2. The method of claim 1, wherein displaying on the visualization surface the ordered navigation interface for providing navigation of the display of the portion of the plurality of content items includes displaying on the visualization surface a timeline interface for providing navigation of the display of the portion of the plurality of content items based on times associated with each of the plurality of content items.

3. The method of claim 1, prior to displaying the portion of the plurality of content items on the visualization surface, further comprising associating each of the plurality of content items with each other based on a prescribed ordering attribute associated with each of the plurality of content items.

4. The method of claim 1, wherein upon receiving a command for navigating from one content item to another content item, moving the display of the portion of the plurality of content items across the visualization surface such that a navigated to one of the plurality of content items is displayed in the primary display position relative to other of the plurality of content items, and such that the navigated to one of the plurality of content items is displayed in a larger display size than a display size for the other of the plurality of content items.

5. The method of claim 1, wherein providing navigation of the display of the portion of the plurality of content items includes providing navigation of the display of the portion of the plurality of content items in a sequential order according to a prescribed ordering attribute associated with each of the plurality of content items.

6. The method of claim 5, wherein, upon receiving an interaction with the ordered navigation interface for navigating the display of the portion of the plurality of content items, moving the display of the portion of the plurality of content items across the visualization surface such that a navigated to one of the plurality of content items is displayed in the primary display position relative to other of the plurality of content items.

7. The method of claim 6, further comprising displaying at a particular point along the ordered navigation interface an icon for indicating an event has occurred to a content item at the particular point along the ordered navigation interface, wherein the particular point along the ordered navigation interface corresponds to the content item displayed with the display of the plurality of content items and associated with the event that has occurred.

8. The method of claim 7, wherein upon receiving a selection of the icon, automatically navigating to the content item associated with the icon such that the content item associated with the icon is displayed in the primary display position relative to other of the plurality of content items.

9. The method of claim 7, further comprising displaying in association with the content item associated with the icon a graphical representation of the event that has occurred to the content item.

10. The method of claim 7, wherein indicating the event has occurred to the content item at the particular point along the ordered navigation interface includes indicating that a content change has occurred for the content item.

11. The method of claim 1, further comprising:

displaying a single content item of the plurality of content items on the visualization surface; and wherein displaying the ordered navigation interface includes displaying the ordered navigation interface where one or more points along the ordered navigation interface corresponds to one or more states of the single content item.

12. A computing device for providing a visualization of electronic content items, comprising:

a processing unit;

a memory; and a content visualization application operative to:

retrieve content items at a data store;

display a portion of content items on a visualization surface according to a prescribed ordering attribute associated with each of the content items;

display an ordered navigation interface on the visualization surface for providing navigation of the content items, the ordered navigation interface including a plurality of arrangement options, each arrangement option being associated with a respective subset of the content items that are associated with a same respective attribute corresponding to the arrangement option;

navigating to a selected content item on the visualization surface;

receiving a request to edit the selected content item;

in response to receiving the request, providing application functionality within the visualization surface to edit the selected content item; and saving the selected content item to the data store.

13. The computing device of claim 12, further comprising receiving an indication that a new content item has been added to the data store.

14. The computing device of claim 13, further comprising updating the visualization surface to display the new content item.

15. The computing device of claim 12, further comprising receiving an indication that a content item has been deleted from the data store.

16. The computing device of claim 12, further comprising updating the visualization surface to remove the content item.

17. The computing device of claim 12, further comprising receiving an indication that a content item at the data store has been edited.

18. The computing device of claim 12, further comprising displaying an indication on the visualization surface indicating the content item has edited.

19. The computing device of claim 12, wherein the content item is edited without separately launching an application having the application functionality.

20. The computing device of claim 12, wherein the ordered navigation interface includes a current focus of the visualization surface, the current focus indicating the portion of the content items that are displayed in the visualization surface.

21. The computing device of claim 12, wherein the application functionality is retrieved by the content visualization application for the portion of the content items.

22. The computing device of claim 12, wherein the selected content item in the content visualization application is a live document, wherein edits may be made and saved according to a native application functionality with which those documents were created.

23. The computing device of claim 22, wherein each content item is linked to the native application functionality.

24. The computing device of claim 12, wherein the ordered navigation interface on the visualization surface for providing navigation of the content items comprises a smaller display of each of the content items.

25. A computer readable storage device forming an article of manufacture and containing computer executable instructions which when executed by a computer perform a method of providing a visualization of electronic content items, comprising:
- retrieving content items at a data store;
- displaying a portion of content items on a visualization surface according to a prescribed ordering attribute associated with each of the content items;
- displaying an ordered navigation interface on the visualization surface for providing navigation of the content items, the ordered navigation interface including a plurality of arrangement options, each arrangement option being associated with a respective subset of the content items that are associated with a same respective attribute corresponding to the arrangement option;
- navigating to a selected content item on the visualization surface;
- when a request to edit the selected content item is received:
  - in response to receiving the request, providing application functionality within the visualization surface to edit the selected content item; and
  - saving the selected content item to the data store; and
- when an event associated with a content item at the data store has occurred:
  - receiving an indication of the event; and
  - updating the visualization surface.

26. The computer readable storage device of claim 25, wherein the event is one of a adding the content item to the data store, removing the content item from the data store, and a change to the content item at the data store.

27. The computer readable storage device of claim 25, wherein providing application functionality within the visualization surface to edit the selected content item comprises functionality to revise the selected content item.

* * * * *